(12) United States Patent
Iwamoto et al.

(10) Patent No.: US 9,036,176 B2
(45) Date of Patent: May 19, 2015

(54) IMAGE FORMING APPARATUS COMMUNICABLE WITH REMOTE DISPLAY APPARATUS

(71) Applicants: Hiroshi Iwamoto, Toyohashi (JP); Kenichi Sawada, Toyohashi (JP); Takatsugu Kuno, Toyokawa (JP); Koichi Amiya, Anjo (JP); Yusaku Tanaka, Toyokawa (JP); Hiroshi Murakami, Nagoya (JP)

(72) Inventors: Hiroshi Iwamoto, Toyohashi (JP); Kenichi Sawada, Toyohashi (JP); Takatsugu Kuno, Toyokawa (JP); Koichi Amiya, Anjo (JP); Yusaku Tanaka, Toyokawa (JP); Hiroshi Murakami, Nagoya (JP)

(73) Assignee: KONICA MINOLTA BUSINESS TECHNOLOGIES, INC., Chiyoda-Ku, Tokyo (JP)

( * ) Notice: Subject to any disclaimer, the term of this patent is extended or adjusted under 35 U.S.C. 154(b) by 167 days.

(21) Appl. No.: 13/786,899

(22) Filed: Mar. 6, 2013

(65) Prior Publication Data
US 2013/0235414 A1    Sep. 12, 2013

(30) Foreign Application Priority Data

Mar. 8, 2012    (JP) .................................. 2012-051735

(51) Int. Cl.
G06K 15/00 (2006.01)
G06K 15/02 (2006.01)
H04N 1/00 (2006.01)

(52) U.S. Cl.
CPC .......... *G06K 15/002* (2013.01); *G06K 15/4005* (2013.01); *G06K 15/1803* (2013.01); *H04N 1/0035* (2013.01)

(58) Field of Classification Search
USPC ................................ 358/1.15, 1.14
See application file for complete search history.

(56) References Cited

U.S. PATENT DOCUMENTS

2007/0109561 A1*  5/2007  Suzue ............................ 358/1.1
2009/0021780 A1*  1/2009  Sato et al. ..................... 358/1.15
2014/0078549 A1*  3/2014  Amiya et al. ................. 358/1.15

FOREIGN PATENT DOCUMENTS

| JP | 2004-187062 A | 7/2004 |
| JP | 2005-321944 A | 11/2005 |
| JP | 2006-086642 A | 3/2006 |
| JP | 2007-140756 A | 6/2007 |
| JP | 2010-224976 A | 10/2010 |
| JP | 2012-023461 A | 2/2012 |

OTHER PUBLICATIONS

Office Action (Notice of Allowance) issued on Feb. 25, 2014, by the Japan Patent Office in corresponding Japanese Patent Application No. 2012-051735, and an English Translation of the Office Action. (5 pages).

* cited by examiner

*Primary Examiner* — Benjamin O Dulaney
(74) *Attorney, Agent, or Firm* — Buchanan Ingersoll & Rooney PC

(57) ABSTRACT

An MFP (Multifunction Peripheral) receives, from a remote terminal, information on a first operation to request the MFP to execute processing. The MFP transmits, to the remote terminal, information on a screen in accordance with the information on the first operation, and receives, from the remote terminal, a report that a screen in accordance with the transmitted information is displayed on the remote terminal. The MFP receives, from the remote terminal, information on a second operation to request the MFP to execute processing, after receipt of the information on the first operation and before receipt of the report, and decides whether to execute or cancel the processing in accordance with the information on the second operation, depending on the type of the information on the second operation.

19 Claims, 27 Drawing Sheets

IMAGE FORMING APPARATUS COMMUNICABLE WITH REMOTE DISPLAY APPARATUS

This application is based on Japanese Patent Application No. 2012-51735 filed with the Japan Patent Office on Mar. 8, 2012, the entire content of which is hereby incorporated by reference.

BACKGROUND OF THE INVENTION

1. Field of the Invention

The present invention relates to an image forming apparatus, and more particularly to an image forming apparatus realizing improved operability.

2. Description of the Related Art

In recent years, a remote panel function has been proposed in an image forming apparatus such as an MFP (Multifunction Peripheral). The remote panel function is for receiving an operation of the image forming apparatus at a remote terminal that is connected to the image forming apparatus by way of a network, transmitting information on the operation from the remote terminal to the image forming apparatus, executing processing in accordance with the information on the operation at the image forming apparatus, and transmitting, to the remote terminal, information on a screen updated due to the processing. The remote panel function enables operations to an operation panel of the image forming apparatus with use of the remote terminal.

With the remote panel function, it may take time for the image forming apparatus to execute processing in accordance with the operation executed at the remote terminal, which will delay update to a screen displayed on the remote terminal. Therefore, in a case where the remote terminal receives a new operation from a user before the remote terminal updates the displayed screen, the screen displayed on the remote terminal may transit to a screen not desired by the user depending on timing of updating the displayed screen. As a result, the remote terminal may erroneously operate (the operation by the user may cause an erroneous operation) in some cases.

Assume a case where the remote terminal successively receives operations to a plurality of keys from a user on a screen initially displayed. In this case, the image forming apparatus executes processing in accordance with the initial key operation by the user, and updates the screen displayed on the remote terminal in accordance with the processing (transits to an updated screen). However, the image forming apparatus determines that the subsequent key operation by the user should have been performed on the updated screen, despite the fact that the subsequent key operation has been performed by the user while viewing the initially displayed screen. As a result, the image forming apparatus executes screen processing unintended by the user, thereby to cause an erroneous operation.

There have been conventionally proposed methods of preventing such an erroneous operation as described above.

FIG. 27 is a sequence diagram showing conventional communication between an MFP having a remote panel function and a remote terminal.

With reference to FIG. 27, when the MFP transmits, to the remote terminal, information on a screen currently displayed on an operation panel (apparatus screen information), the remote terminal displays, in accordance with the information, a screen same as the screen currently displayed on the operation panel. Upon receipt of a key operation from a user, the remote terminal transmits information on the key operation to the MFP. Upon receipt of the information on the key operation, the MFP comes into a key reception inhibition state (the state for not receiving a subsequent key operation), and executes processing in accordance with the key operation. The MFP transmits, to the remote terminal, data of a screen updated due to the processing. When the remote terminal updates the displayed screen in accordance with the data thus received, the remote terminal transmits an update completion report to the MFP. Upon receipt of the update completion report, the MFP cancels the key reception inhibition state.

In the sequence diagram mentioned above, the MFP does not receive input of a subsequent operation from the remote terminal until completion of update of the screen.

In addition to the technique described above, Document 1 discloses a display control apparatus that causes an operation unit to stop receiving, in a case where the operation unit receives an operation instruction corresponding to operation screens successively switched and displayed on a display unit of an electric appliance or the like, any operation instruction corresponding to a switched operation screen, in a predetermined period of time from completion of reception by the operation unit to switching of the operation screen to a different operation screen.

Document 2 discloses an image forming apparatus for distributing a web page to a terminal device of an image forming apparatus. The image forming apparatus includes operation screen control means for controlling an operation screen displayed on the image forming apparatus and an operation screen displayed as a web page on the terminal device of the image forming apparatus such that use of one of the operation screens is inhibited while the other operation screen is being used.

Document 3 discloses a remote control system that includes a control target computer and a control terminal for transmitting input information to the control target computer, wherein the control target computer transmits, to the control terminal, displayed image information displayed on a display unit of the control target computer in accordance with the input information transmitted from the control terminal, and the control terminal displays, on a display unit of the control terminal, the displayed image information thus transmitted. In this system, the control target computer includes a display data processor for processing displayed image information displayed on the display unit of the control target computer in accordance with display capacity information on the control terminal and a transfer rate of data in communication with the control terminal, and a server communicator for transmitting, to the control terminal, the displayed image information processed by the display data processor.

Document 1: Japanese Patent Publication Laying-Open No. 2010-224976

Document 2: Japanese Patent Publication Laying-Open No. 2006-86642

Document 3: Japanese Patent Publication Laying-Open No. 2004-187062

In the conventional image forming apparatus, input of any subsequent operation is not received from the remote terminal until completion of update of a screen. Therefore, a user cannot successively operate the remote terminal, which deteriorates operability. For example, in a case where the remote terminal receives an operation to execute script processing which is a processing having a batch of setting information for execution of specific processing, the remote terminal successively transmits, to the image forming apparatus, information on a series of operations for the processing, without waiting for reception of data of an updated screen. Nevertheless, these operations are blocked and cancelled by the image forming apparatus. In a state where the remote terminal displays list data such as a list of facsimile transmission addresses, if the remote terminal receives a flick operation to scroll a screen, the image forming apparatus does not receive the operation until the remote terminal displays a scrolled screen. Therefore, it is not possible to halfway stop scrolling.

SUMMARY OF THE INVENTION

It is an object of the present invention to provide an image forming apparatus, which realize improved operability.

According to an aspect of the present invention, there is provided an image forming apparatus capable of receiving an instruction to execute processing from a remote display apparatus for displaying a screen same as a screen displayed on the image forming apparatus, the image forming apparatus including: a first operation information receiver for receiving, from the display apparatus, information on a first operation to request the image forming apparatus to execute processing; a transmitter for transmitting, to the display apparatus, information on a screen in accordance with the information on the first operation; a report receiver for receiving, from the display apparatus, a report that a screen in accordance with the information transmitted from the transmitter is displayed on the display apparatus; a second operation information receiver for receiving, from the display apparatus, information on a second operation to request the image forming apparatus to execute processing, after reception of the information on the first operation and before reception of the report; and a decision unit for deciding whether to execute or cancel the processing in accordance with the information on the second operation, depending on a type of the information on the second operation.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Described below is an embodiment of the present invention with reference to the drawings.

An image forming system according to the present embodiment includes a display apparatus and an image forming apparatus. The image forming apparatus may be an MFP, a facsimile apparatus, a copier, a printer, or the like, which has a scanning function, a facsimile function, a copying function, a printing function, a data communication function, and a server function. The display apparatus is capable of displaying various types of information as well as communicating with the image forming apparatus. The display apparatus is a remote terminal such as a PC (Personal Computer) or a personal digital assistant.

[Configuration of Image Forming System]

Initially described is a schematic configuration of the image forming system.

Figure 1:
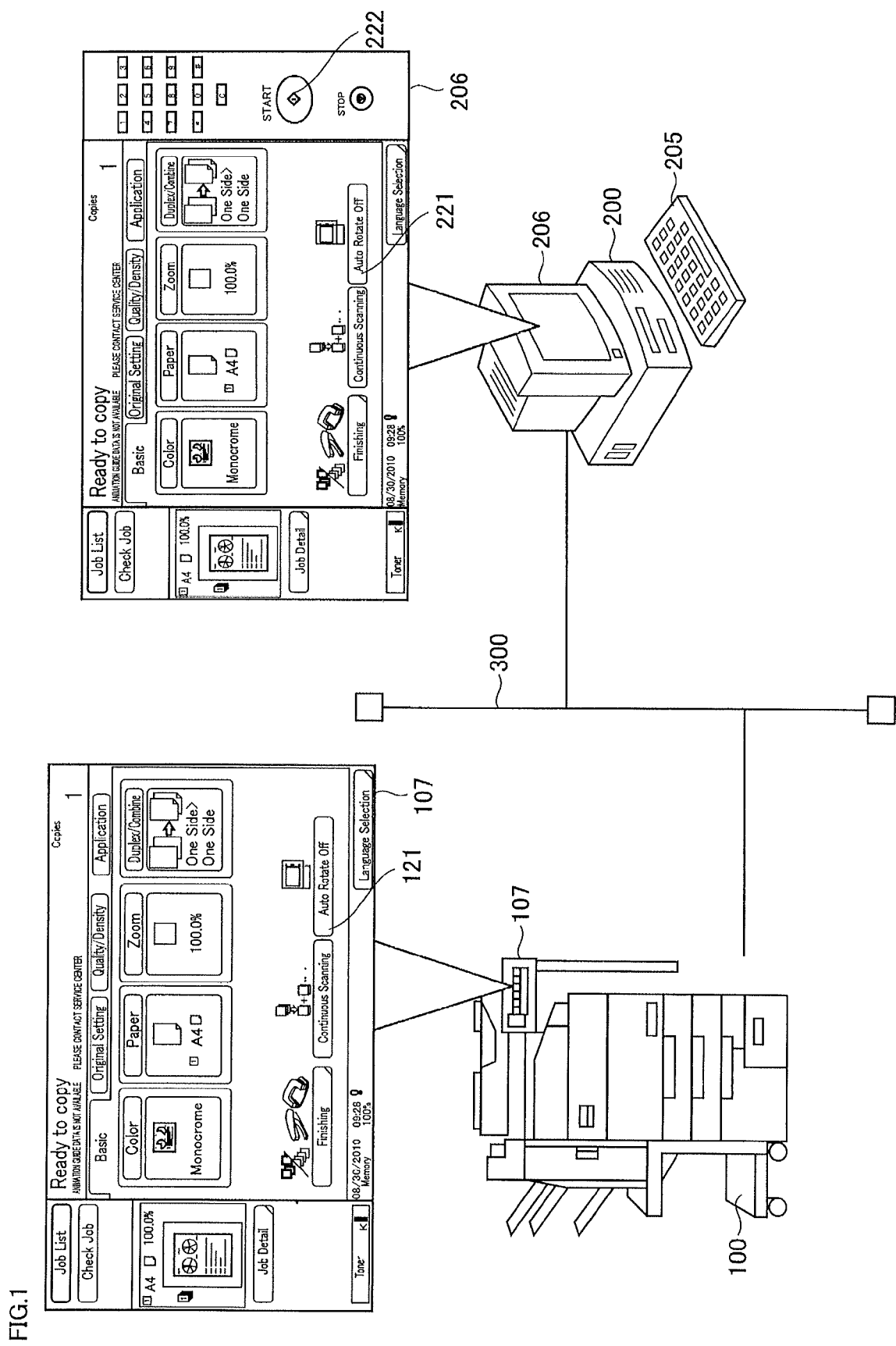
FIG. 1 is a conceptual diagram of an image forming system according to an embodiment of the present invention.

With reference to FIG. 1, the image forming system according to the present embodiment includes an MFP 100 serving as an image forming apparatus and a remote terminal 200 serving as a display apparatus. MFP 100 includes an operation panel 107. Remote terminal 200 includes an operation unit 205 and a display unit 206. MFP 100 and remote terminal 200 are connected to a network 300, and are communicable with each other by way of network 300.

Network 300 is configured by a wired or wireless LAN (Local Area Network). Network 300 is connected in accordance with a protocol of TCP/IP (Transmission Control Protocol/Internet Protocol). Apparatuses connected to network 300 are capable of mutually transmitting and receiving various data. Respective apparatuses may be connected by way of a wide area network such as the Internet or dedicated lines, in place of network 300.

MFP 100 can receive operations to be executed by MFP 100 from each of operation panel 107 and operation unit 205. Upon receipt of an operation to be executed by MFP 100, MFP 100 executes processing in accordance with the operation thus received, and transmits, to remote terminal 200, data of a screen having been replaced by the processing. Remote terminal 200 displays a screen on display unit 206 in accordance with the data received from MFP 100. In this manner, a screen displayed on operation panel 107 is synchronized with a screen displayed on display unit 206.

Operation panel 107 displays various software keys 121. On the other hand, display unit 206 displays software keys 221 corresponding to software keys 121 displayed on operation panel 107, as well as software keys 222 corresponding to hardware keys 122 (FIG. 2) included in operation panel 107.

Figure 2:
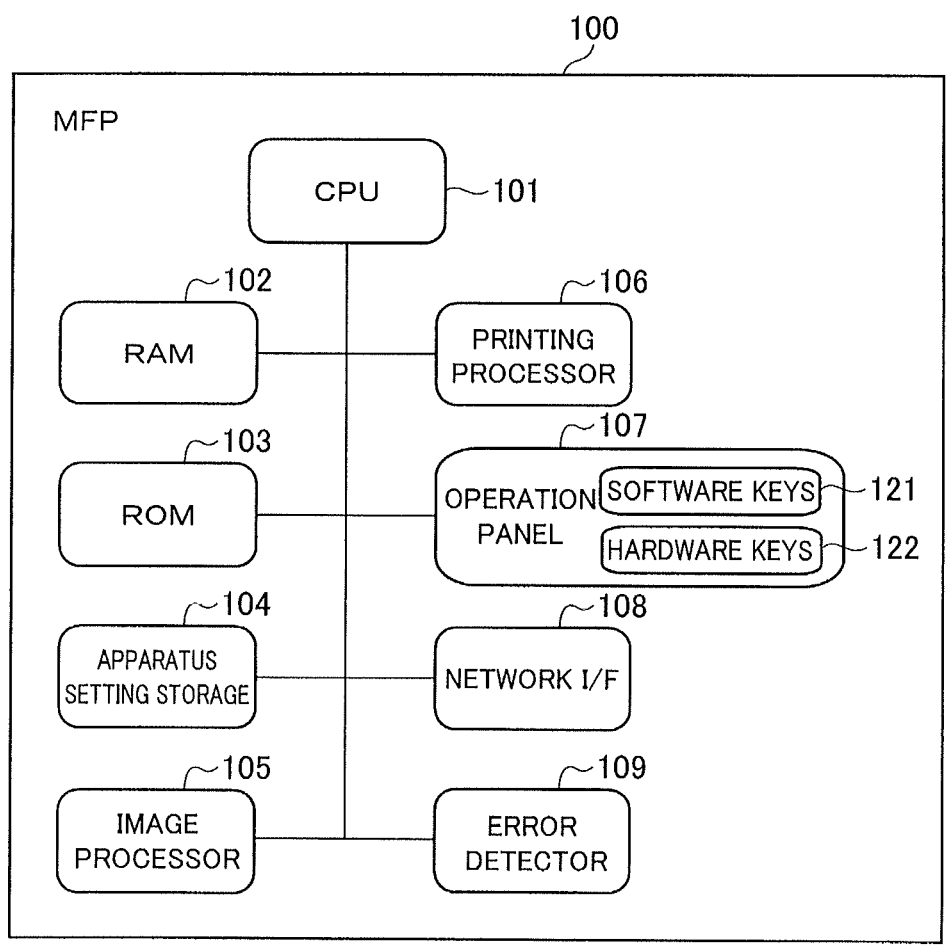
FIG. 2 is a block diagram showing an internal configuration of an MFP 100.

FIG. 2 is a block diagram showing an internal configuration of MFP 100.

With reference to FIG. 2, MFP 100 has a duplicating function, and includes a CPU (Central Processing Unit) 101, a RAM (Random Access Memory) 102, a ROM (Read Only Memory) 103, apparatus setting storage 104, an image processor 105, a printing processor 106, operation panel 107, a network I/F 108, an error detector 109, and the like. Each of RAM 102, ROM 103, apparatus setting storage 104, image processor 105, printing processor 106, operation panel 107, network I/F 108, and error detector 109 is connected to CPU 101 by way of a bus.

CPU 101 entirely controls MFP 100 in terms of various jobs such as a scanning job, a copying job, a mail sending job, and a printing job. CPU 101 also executes a control program stored in ROM 103. CPU 101 executes predetermined processing to read data from RAM 102 or ROM 103, or to write data to RAM 102 or ROM 103.

RAM 102 is a main memory of CPU 101. RAM 102 is used to temporarily store image data and data necessary for CPU 101 to execute the control program.

ROM 103 is a flash ROM (Flash Memory), for example. ROM 103 stores various programs used to operate MFP 100 and various fixed data. ROM 103 may be unrewritable.

Apparatus setting storage 104 is configured by an HDD (Hard Disk Drive) or the like, and stores apparatus location information, data of a screen displayed on operation panel 107, various data relevant to the operations of MFP 100, and the like. Apparatus setting storage 104 also stores, in a box, data such as print data transmitted from remote terminal 200 or the like by way of network I/F 108.

Image processor 105 executes various processing such as RIP (Raster image processing) to print data and conversion processing of converting a format of data upon sending out the data.

Printing processor 106 executes processing of printing on a sheet or the like in accordance with image data processed by image processor 105.

Operation panel 107 includes a key input part provided with a numeric keypad, a start key, and the like, and a display part provided with a touch panel display. Operation panel 107 receives, from a user, various input operations such as execution of various jobs by MFP 100. Operation panel 107 also displays, to a user, various setting options for MFP 100, messages, and the like. Operation panel 107 includes, as the key input part, software keys 121 displayed on the touch panel display, and hardware keys 122 of physically substantial buttons.

Network I/F 108 communicates with remote terminal 200 by way of network 300 or the like in accordance with a communication protocol such as TCP/IP upon receipt of an instruction from CPU 101. The network transmits and receives screen information, image data, and the like, to and from remote terminal 200 connected by way of a LAN or the like.

Error detector 109 detects an error such as a sheet jam, lack of a sheet, erroneous input of an operation received by MFP 100, or the like.

Figure 3:
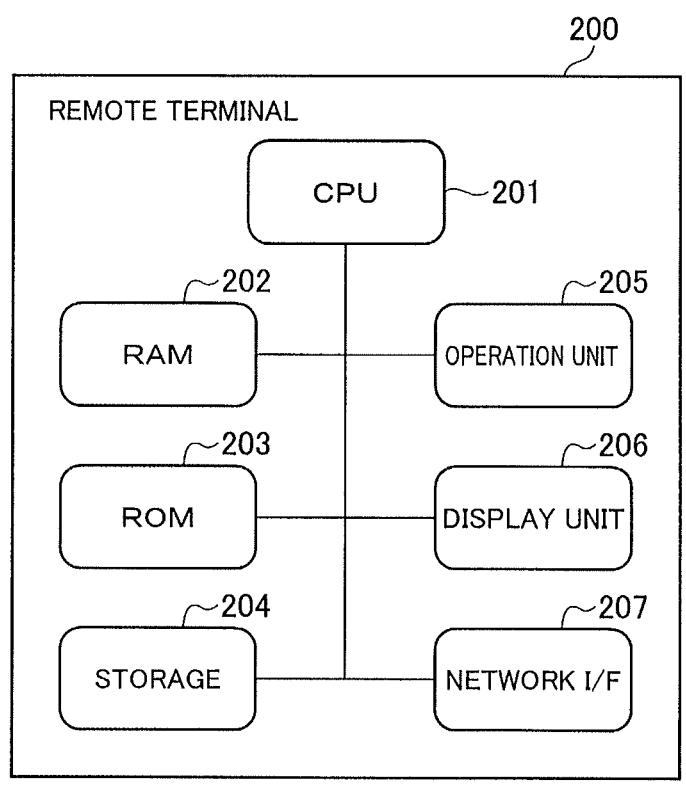
FIG. 3 is a block diagram showing an internal configuration of a remote terminal 200.

FIG. 3 is a block diagram showing an internal configuration of remote terminal 200.

With reference to FIG. 3, remote terminal 200 includes a CPU 201, a RAM 202, a ROM 203, storage 204, operation unit 205, display unit 206, a network I/F 207, and the like. Each of RAM 202, ROM 203, storage 204, operation unit 205, display unit 206, and network I/F 207 is connected to CPU 201 by way of a bus.

CPU 201 entirely controls remote terminal 200. CPU 201 also executes a control program stored in ROM 203. CPU 201 executes predetermined processing to read data from RAM 202 or ROM 203, or to write data to RAM 202 or ROM 203.

RAM 202 is a main memory of CPU 201. RAM 202 is used to store data necessary for CPU 201 to execute the control program, or the like.

ROM 203 is a flash ROM (Flash Memory), for example. ROM 203 stores various programs used to operate remote terminal 200 and various fixed data. ROM 203 may be unrewritable.

Operation unit 205 receives, from a user, various instructions relevant to remote terminal 200.

Display unit 206 displays various setting options for remote terminal 200, messages, and the like. Display unit 206 also displays a screen in accordance with screen information received from MFP 100.

Storage 204 is configured by an HDD or the like, and stores data of a screen displayed on display unit 206, screen information transmitted from MFP 100 by way of network 300, and the like.

Network I/F 207 communicates with an external apparatus such as MFP 100 by way of network 300 or the like in accordance with a communication protocol such as TCP/IP upon receipt of an instruction from CPU 201.

In the image forming system thus configured, upon receipt, from a user, of a first operation to request MFP 100 to execute processing, remote terminal 200 transmits information on the first operation to MFP 100. Upon receipt of the information on the first operation from remote terminal 200, MFP 100 executes the processing in accordance with the information on the first operation, and transmits information on a screen updated due to the processing to remote terminal 200. Remote terminal 200 receives the information on the updated screen and displays, on display unit 206, an updated screen in accordance with the information thus received. Then, remote terminal 200 transmits, to MFP 100, a report that the updated screen is displayed. If MFP 100 receives, from remote terminal 200, information on a second operation to request MFP 100 to execute processing after the receipt of the information on the first operation and before the receipt of the report, MFP 100 decides whether to execute or cancel the processing in accordance with the information on the second operation, depending on the type of the information on the second operation. Described below are several exemplary methods of deciding whether to execute or cancel the processing in accordance with the information on the second operation.

[First Decision Method]

In the first decision method, MFP 100 decides whether to execute or cancel the processing in accordance with the information on the second operation, depending on whether the information on the second operation corresponds to an operation to any of software keys 121 or an operation to any of hardware keys 122 of operation panel 107.

Figure 4:
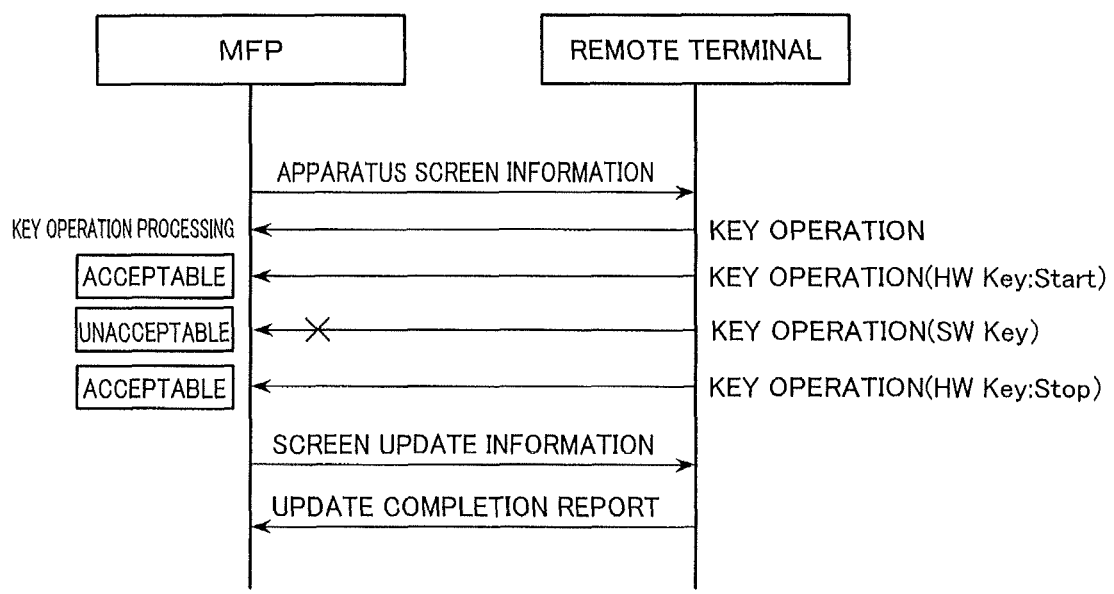
FIG. 4 is a sequence diagram showing communication between MFP 100 and remote terminal 200 in a case of adopting a first decision method.

FIG. 4 is a sequence diagram showing communication between MFP 100 and remote terminal 200 in the case of adopting the first decision method.

With reference to FIG. 4, MFP 100 transmits, to remote terminal 200, information on a screen to be displayed on operation panel 107 (apparatus screen information inclusive of information on an LCD (Liquid Crystal Display) screen, information on a state of an LED (Light Emitting Diode), and the like). This screen information includes information on software keys 121 and hardware keys 122 of operation panel 107. Remote terminal 200 displays a screen in accordance with the information thus received on display unit 206 (monitor). As a result, display unit 206 displays software keys 221 corresponding to software keys 121 of operation panel 107, and software keys 222 corresponding to hardware keys 122 of operation panel 107.

Upon receipt, from a user, of an operation to a key displayed on display unit 206, remote terminal 200 transmits information on the key operation thus received (information on the first operation) to MFP 100. Remote terminal 200 transmits information on the operation to any of software keys 221 (LCD touch information) or information on the operation to any of software keys 222 (hardware key information).

Upon receipt of the information on the operation from remote terminal 200, MFP 100 executes processing in accordance with the information thus received (key operation processing). Assume a case where MFP 100 receives information on a subsequent operation (information on the second operation) from remote terminal 200 while executing the key operation processing. In this case, if the information on the subsequent operation relates to an operation to any of software keys 222 such as the start key or a stop key, MFP 100 executes processing in accordance with the information. For example, MFP 100 executes printing upon receipt of information on an operation to the start key, or MFP 100 temporarily stops printing upon receipt of information on an operation to the stop key. On the other hand, if the information on the subsequent operation relates to an operation to any of software keys 221 (LCD operation information), MFP 100 cancels the processing in accordance with the information on the subsequent operation.

Upon completion of the key operation processing in accordance with the received information on the operation, MFP 100 transmits, to remote terminal 200, information on a screen updated due to the processing in accordance with the received information on the operation (screen update information). For example, if the received information on the operation relates to an operation to the stop key, MFP 100 transmits information on an updated screen reporting that printing has been temporarily stopped. Remote terminal 200 displays, on display unit 206, a screen updated in accordance with the information thus received, and transmits, to MFP 100, an update completion report of reporting that the updated screen is displayed on remote terminal 200. MFP 100 completes the key operation processing upon receipt of an update completion report from remote terminal 200. If MFP 100 receives information on an operation indicating that any of software keys 221 is pressed after the receipt of the update completion report, MFP 100 executes processing in accordance with the information.

Screen information may be an ID (Identification) of a screen, or may be screen data itself. In a case where MFP 100 transmits an ID of a screen, remote terminal 200 searches screen data in storage 204 based on the ID of the screen, and displays, on display unit 206, a screen in accordance with the screen data obtained by the search. In a case where MFP 100 transmits screen data, remote terminal 200 displays, on display unit 206, a screen in accordance with the screen data thus received. In the latter case, remote terminal 200 does not need to store screen data.

Described next is an exemplary flowchart of operations of MFP 100 in the case of adopting the first decision method.

Figure 5:
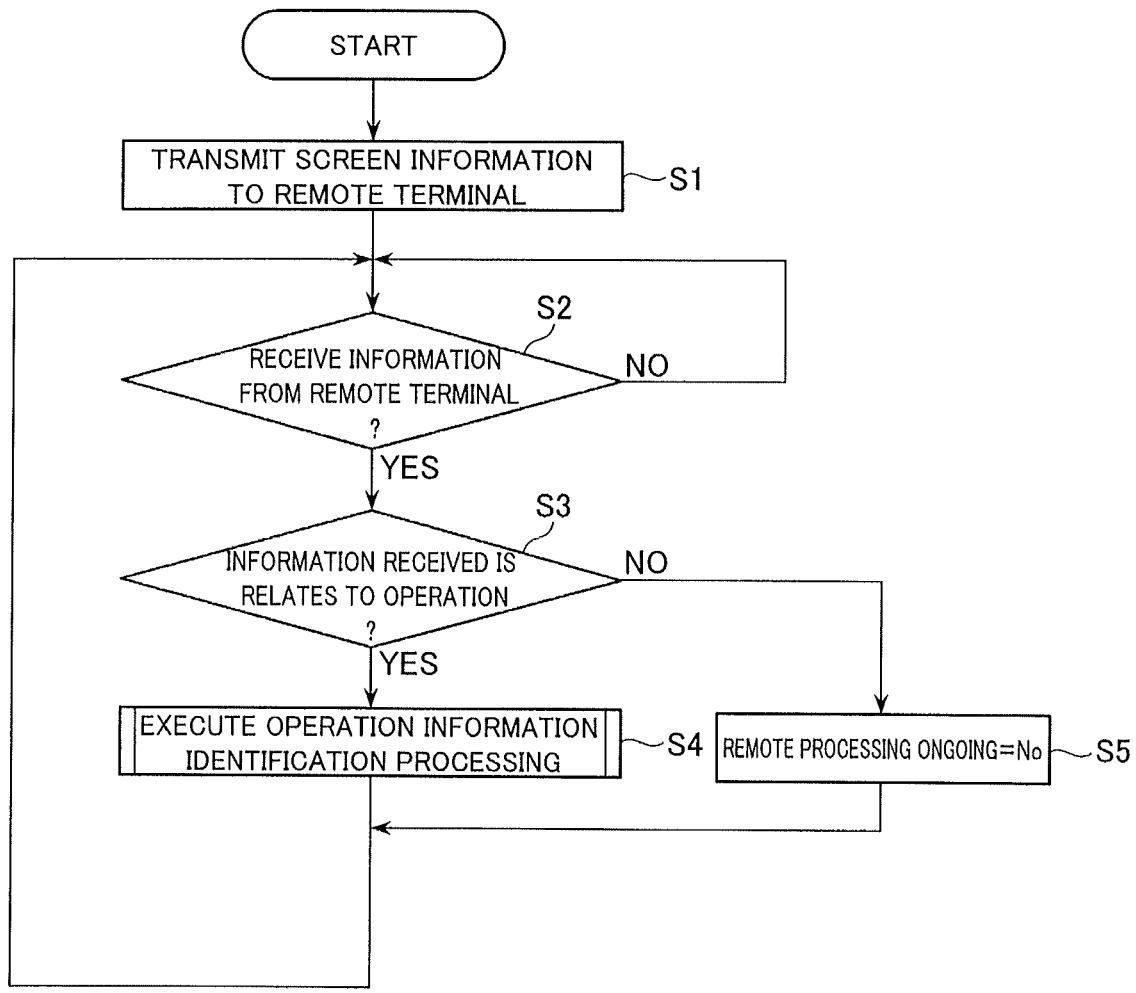
FIG. 5 shows main routine executed by MFP 100.

FIG. 5 shows main routine executed by MFP 100.

With reference to FIG. 5, when CPU 101 of MFP 100 transmits (sends) screen information to remote terminal 200 (S1), CPU 101 determines whether or not information is received from remote terminal 200 (S2), CPU 101 repeats the processing in step S2 until determining that information is received. If determined that information is received in step S2 (YES in S2), CPU 101 determines whether or not the information thus received relates to an operation (S3).

If determined that information on an operation is received in step S3 (YES in S3), CPU 101 executes operation information identification processing to be described later (S4), and then returns. On the other hand, if determined that an update completion report is received in step S3 (NO in S3), CPU 101 clears a remote processing ongoing flag (S5), and then returns.

Figure 6:
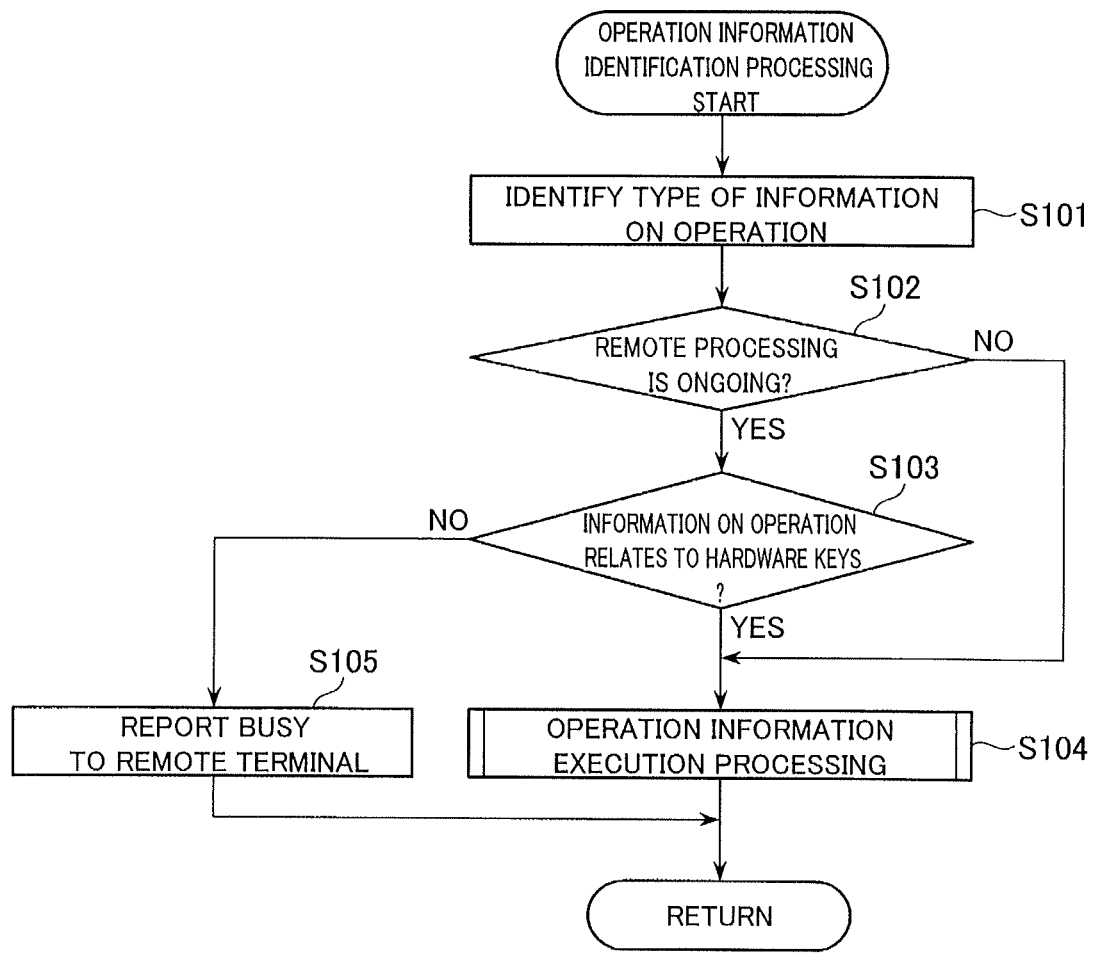
FIG. 6 shows sub routine in step S4 of FIG. 5 in the first decision method.

FIG. 6 shows sub routine in step S4 of FIG. 5 in the first decision method.

With reference to FIG. 6, in the operation information identification processing in step S4, CPU 101 identifies the type of the information on the operation (S101), and determines whether or not remote processing is ongoing by referring to a remote processing ongoing flag (S102).

If determined that remote processing is ongoing in step S102 (YES in S102), CPU 101 determines whether or not the information on the operation relates to an operation to any of the hardware keys (S103). On the other hand, if determined that remote processing is not ongoing in step S102 (NO in S102), CPU 101 proceeds to processing in step S104.

If determined that the information on the operation relates to an operation to any of the hardware keys in step S103 (YES in S103), CPU 101 executes operation information execution processing to be described later (S104), and then returns. On the other hand, if determined that the information on the operation relates to an operation to any of the software keys in step S103 (NO in S103), CPU 101 cancels the processing in accordance with the information on the operation, reports to remote terminal 200 that MFP 100 is busy (S105), and then returns.

Figure 7:
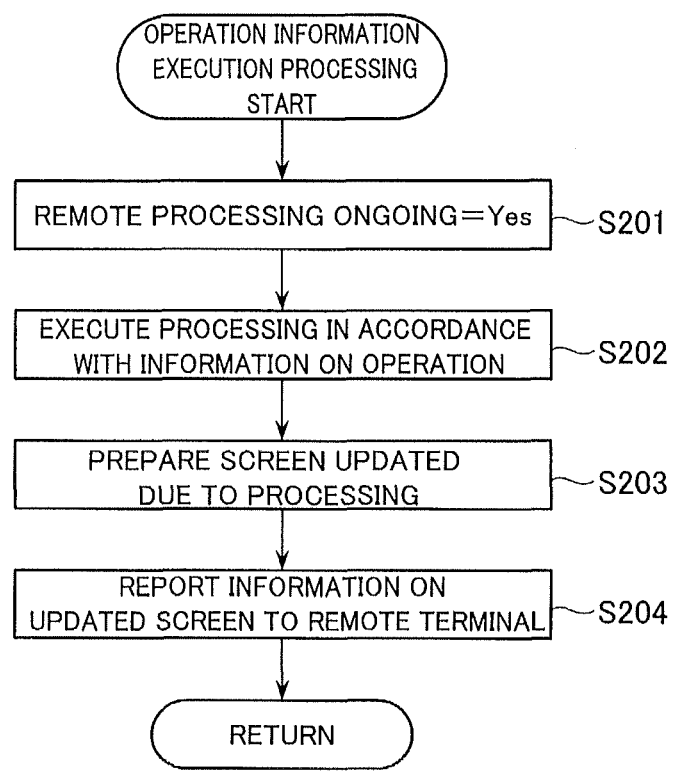
FIG. 7 shows sub routine in step S104 of FIG. 6.

FIG. 7 shows sub routine in step S104 of FIG. 6.

With reference to FIG. 7, in the operation information execution processing in step S104, CPU 101 sets a remote processing ongoing flag (S201), and executes processing in accordance with the information on the operation (S202). Subsequently, CPU 101 prepares a screen updated due to the processing (S203), reports information on the updated screen to remote terminal 200 (S204), and then returns.

In the first decision method, MFP 100 has only to decide whether to execute or cancel the processing in accordance with the information on the second operation, depending on whether or not the information on the second operation requests execution of processing for transition of the screen on display unit 206 of remote terminal 200. Generally, software keys 121 of operation panel 107 are used to request execution of processing for transition of a screen displayed on remote terminal 200, while hardware keys 122 of operation panel 107 are not used to request execution of processing for transition of a screen displayed on remote terminal 200. Therefore, the above first decision method refers to the case of deciding whether to execute or cancel the processing in accordance with the information on the second operation depending on whether the information on the operation received by MFP 100 relates to an operation to any of software keys 121 of operation panel 107 or relates to an operation to any of hardware keys 122 thereof.

Described next is an exemplary flowchart of operations of remote terminal 200.

Figure 8:
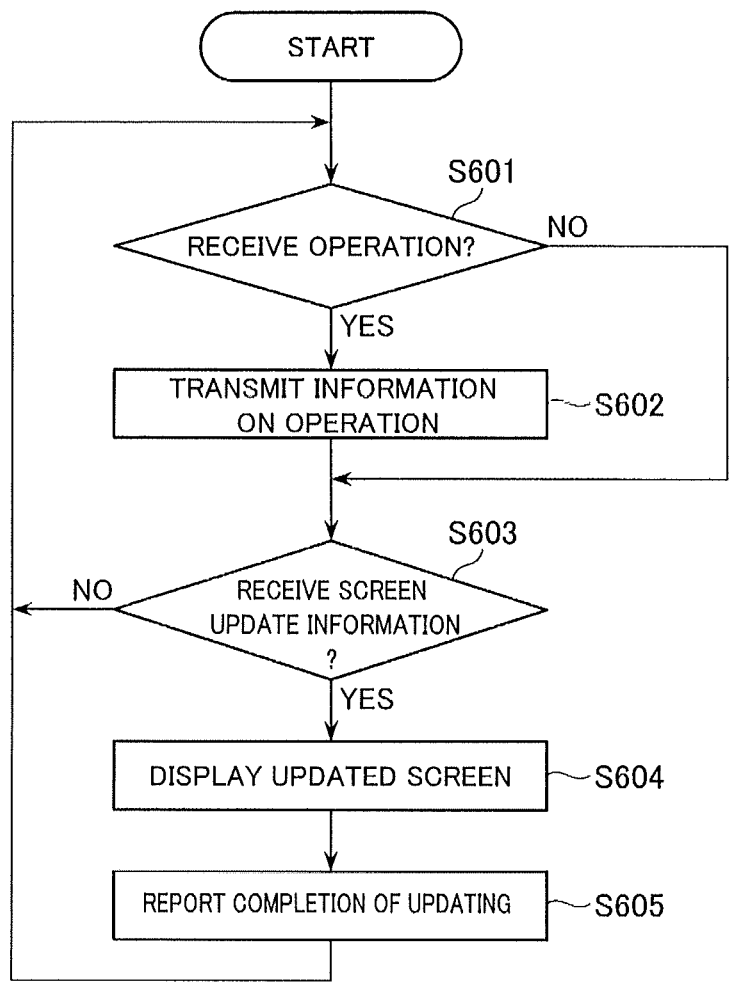
FIG. 8 is a flowchart showing operations of remote terminal 200.

FIG. 8 is a flowchart showing the operations of remote terminal 200.

With reference to FIG. 8, CPU 201 of remote terminal 200 determines whether or not an operation is received by operation unit 205 (S601). If determined that an operation is received in step S601 (YES in S601), CPU 201 transmits information on the operation to MFP 100 (S602), and then proceeds to processing in step S603. On the other hand, if determined that any operation is not received in step S601 (NO in S601), CPU 201 proceeds to the processing in step S603.

In step S603, CPU 201 determines whether or not screen update information is received from MFP 100 (S603). If determined that screen update information is received in step S603 (YES in S603), CPU 201 displays a screen updated in accordance with the screen update information (S604), transmits an update completion report to MFP 100 (S605), and then proceeds to processing in step S601. On the other hand, if determined that any screen update information is not received in step S603 (NO in S603), CPU 201 proceeds to the processing in step S601.

[Second Decision Method]

In the second decision method, as well as in third and fourth decision methods to be described later, MFP 100 decides whether to execute or cancel the processing in accordance with the information on the second operation, further depending on the type of input MFP 100 awaits when MFP 100 receives the information on the second operation from remote terminal 200. Particularly in the second decision method, in a case where MFP 100 awaits input of any number, if the information on the second operation requests input of a number, MFP 100 decides to execute the processing in accordance with the information on the second operation.

Figure 9:
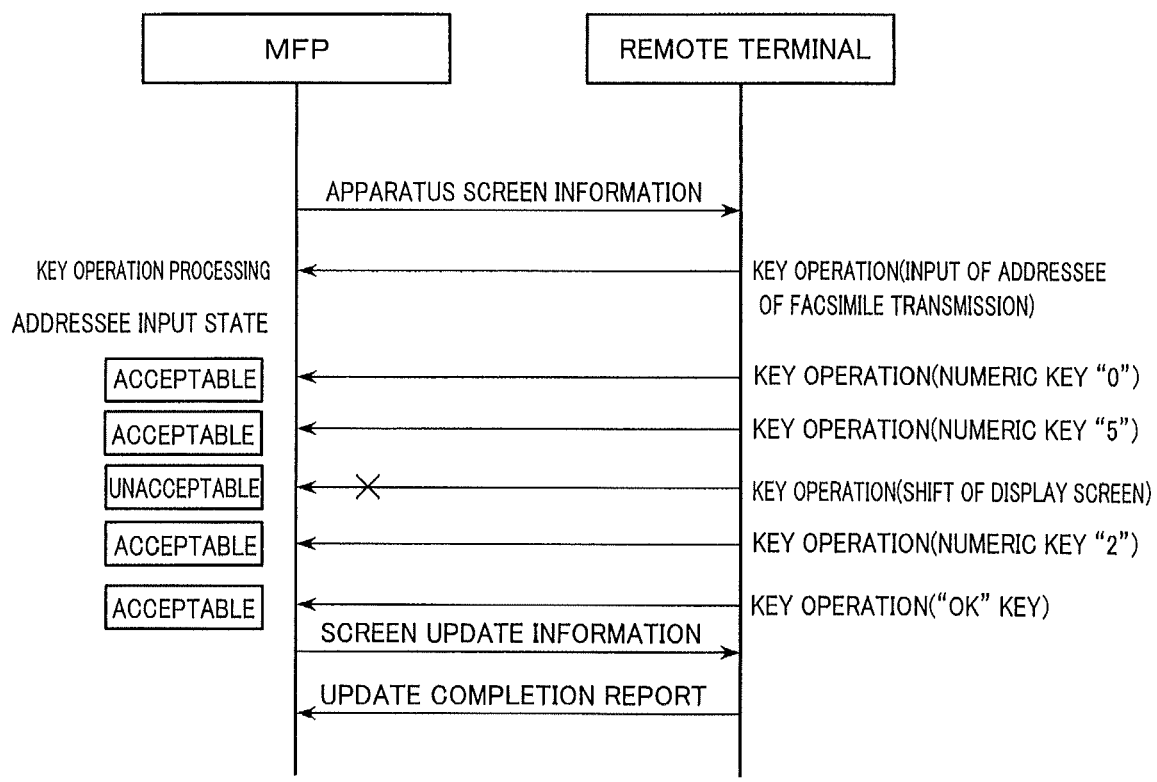
FIG. 9 is a sequence diagram showing communication between MFP 100 and remote terminal 200 in a case of adopting a second decision method.

FIG. 9 is a sequence diagram showing communication between MFP 100 and remote terminal 200 in the case of adopting the second decision method.

With reference to FIG. 9, MFP 100 transmits, to remote terminal 200, screen information (apparatus screen information) on a screen displayed on operation panel 107. Remote terminal 200 displays, on display unit 206, a screen in accordance with the screen information thus received.

When remote terminal 200 receives, from a user, a key operation to display a screen for inputting an addressee of facsimile transmission, or a screen for inputting the number of copies, remote terminal 200 transmits information on the key operation thus received (information on the first operation) to MFP 100.

Upon receipt of the information on the operation from remote terminal 200, MFP 100 executes processing in accordance with the information thus received (key operation processing), so as to come into a state for awaiting input of any number such as a phone number of the addressee or the number of copies. Assume a case where MFP 100 receives, from remote terminal 200, information on a subsequent operation (information on the second operation) while preparing information on a screen updated due to the processing (updated screen for awaiting input of any number). In this case, if the information on the subsequent operation relates to an operation to a numeric key, MFP 100 executes processing in accordance with the information on the operation. For example, upon receipt of information on an operation to a numeric key such as "0", "5", or "2", MFP 100 receives the corresponding number as input to a column of a phone number or a column of the number of copies in a screen for inputting an addressee. On the other hand, if the information on the subsequent operation relates to an operation not relevant to a number (shift of a display screen, for example), MFP 100 cancels the processing in accordance with the information on the subsequent operation.

Upon completion of the key operation processing in accordance with the received information on the operation, MFP 100 transmits, to remote terminal 200, information on a screen updated due to the processing in accordance with the received information on the operation (screen update information). For example, upon receipt of information on the operations to the numeric keys of "0", "5", and "2", MFP 100 transmits information on a screen updated by inputting the numbers "052" to the column of a phone number or the column of the number of copies. Remote terminal 200 displays, on display unit 206, a screen updated in accordance with the screen update information thus received, and transmits, to MFP 100, an update completion report of reporting that the updated screen is displayed on remote terminal 200. MFP 100 completes the key operation processing upon receipt of an operation completion report from remote terminal 200. If MFP 100 receives information on a new operation after the receipt of the operation completion report, MFP 100 executes processing in accordance with the information.

Described next is an exemplary flowchart of operations of MFP 100 in the case of adopting the second decision method.

In the case of adopting the second decision method, a flowchart showing main routine of the operations of MFP 100 and a flowchart showing the operations of remote terminal 200 are the same as those shown in FIGS. 5 and 8, respectively. Therefore, the same details will not be repeated herein.

Figure 10:
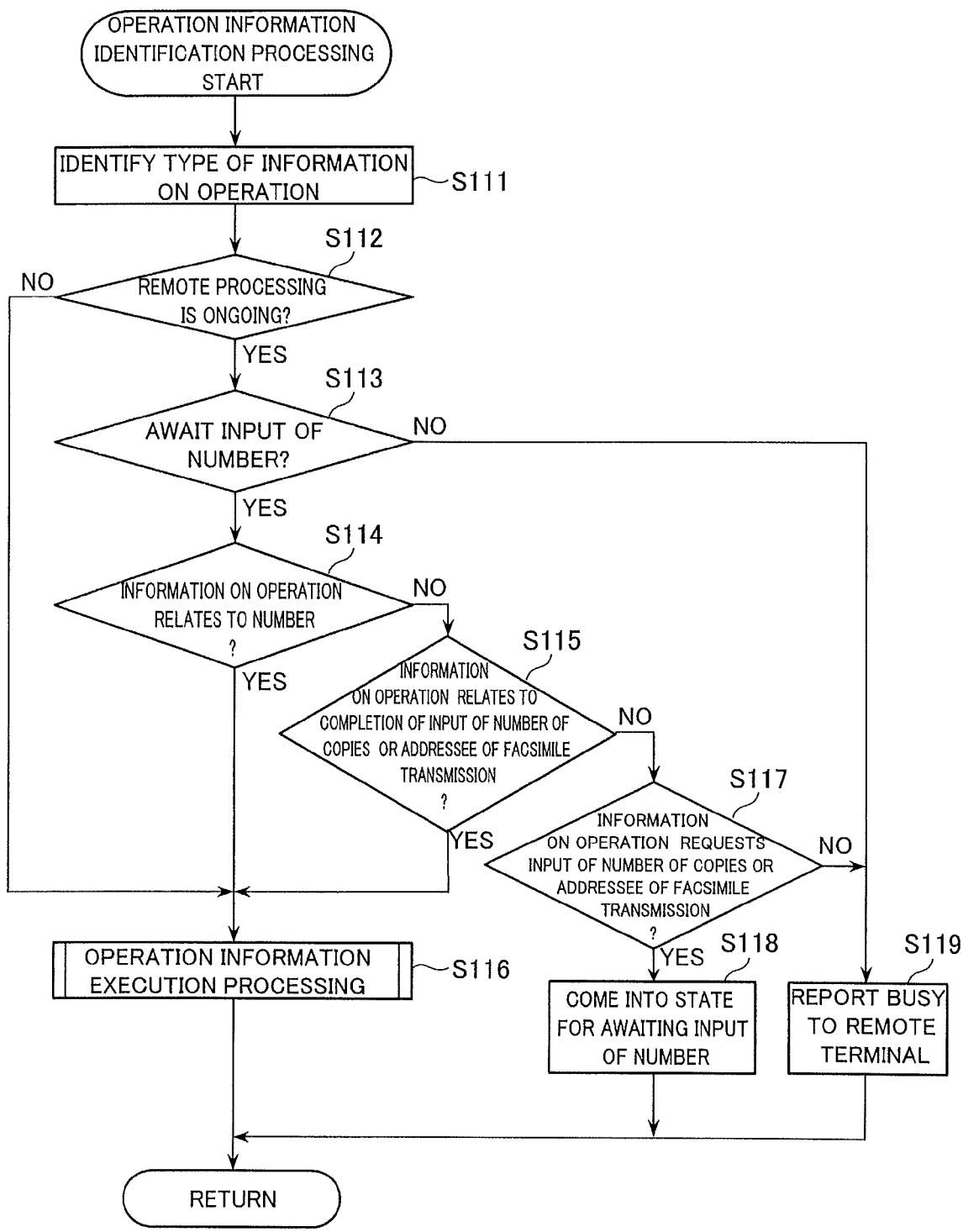
FIG. 10 shows sub routine in step S4 of FIG. 5 in the second decision method.

FIG. 10 shows sub routine in step S4 of FIG. 5 in the second decision method.

With reference to FIG. 10, in the operation information identification processing in step S4, CPU 101 identifies the type of information on an operation (S111), and determines whether or not remote processing is ongoing by referring to a remote processing ongoing flag (S112).

If determined that remote processing is ongoing in step S112 (YES in S112), CPU 101 determines whether or not MFP 100 is in a state for awaiting input of any number (S113). On the other hand, if determined that remote processing is not ongoing in step S112 (NO in S112), CPU 101 proceeds to processing in step S116.

If determined that MFP 100 is in a state for awaiting input of any number in step S113 (YES in S113), CPU 101 determines whether or not the received information on the operation relates to an operation to any numeric key (S114).

If determined that the received information on the operation relates to an operation to any numeric key in step S114 (YES in S114), CPU 101 executes operation information execution processing to be described later (S116), and then returns. On the other hand, if determined that the received information on the operation does not relate to an operation to any numeric key (NO in S114), CPU 101 determines whether or not the information on the operation indicates completion of input of the number of copies or completion of input of an addressee of facsimile transmission (S115).

If determined that the information on the operation indicates completion of input of the number of copies or completion of input of an addressee of facsimile transmission in step S115 (YES in S115), CPU 101 proceeds to the processing in step S116. On the other hand, if determined that the information on the operation does not indicate completion of input of the number of copies or completion of input of an addressee of facsimile transmission in step S115 (NO in S115), CPU 101 determines whether or not the information on the operation requests input of the number of copies or input of an addressee of facsimile transmission (S117).

If determined that the information on the operation requests input of the number of copies or input of an addressee of facsimile, transmission in step S117 (YES in S117), CPU 101 comes into a state for awaiting input of any number (S118), and then returns.

If determined that MFP 100 is not in a state for awaiting input of any number in step S113 (NO in step S113), or if determined that the information on the operation requests neither input of the number of copies nor input of an addressee of facsimile transmission in step S117 (NO in S117), CPU 101 cancels the processing in accordance with the information on the operation, reports to remote terminal 200 that MFP 100 is busy (S119), and then returns.

Figure 11:
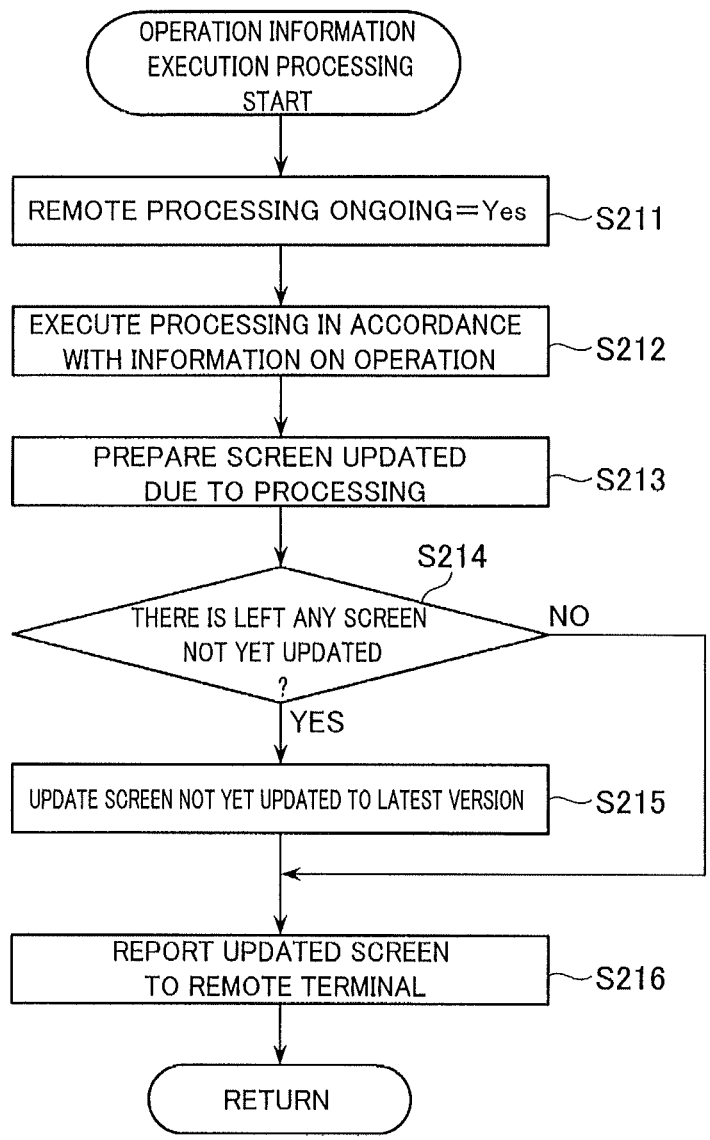
FIG. 11 shows sub routine in step S116 of FIG. 10.

FIG. 11 shows sub routine in step S116 of FIG. 10.

With reference to FIG. 11, in the operation information execution processing in step S116, CPU 101 sets a remote processing ongoing flag (S211), and executes processing in accordance with the information on the operation (S212). CPU 101 then prepares a screen updated due to the processing (S213), and determines whether or not there is left any screen not yet updated (S214). If determined that there is left any screen not yet updated in step S214 (YES in step S214), CPU 101 updates the screen not yet updated to a latest version (S215), and then proceeds to processing in step S216.

The screen not yet updated is a screen on which any update completion report due to processing in accordance with the information on the operation has not yet been received from remote terminal 200, despite the fact that information on an operation has been received from remote terminal 200. Assume a case where MFP 100 has received information on a key operation to display a screen for inputting an addressee of facsimile transmission or a screen for inputting the number of copies. In this case, if any update completion report on an updated screen serving as an input screen thereof has not yet been received from remote terminal 200, there is left a screen not yet updated. In this case, MFP 100 updates to a latest screen having received the numbers "052" in the predetermined input column, in accordance with the subsequently received information on the operation.

If determined that there is left no screen not yet updated in step S214 (NO in step S214), CPU 101 proceeds to the processing in step S216.

In step S216, CPU 101 reports an updated screen to remote terminal 200, and then returns.

[Third Decision Method]

In the third decision method, in a case where MFP 100 awaits input of a password, if the information on the second operation relates to an input operation of at least one of any number and any alphabet, MFP 100 decides to execute the processing in accordance with the information on the second operation.

Figure 12:
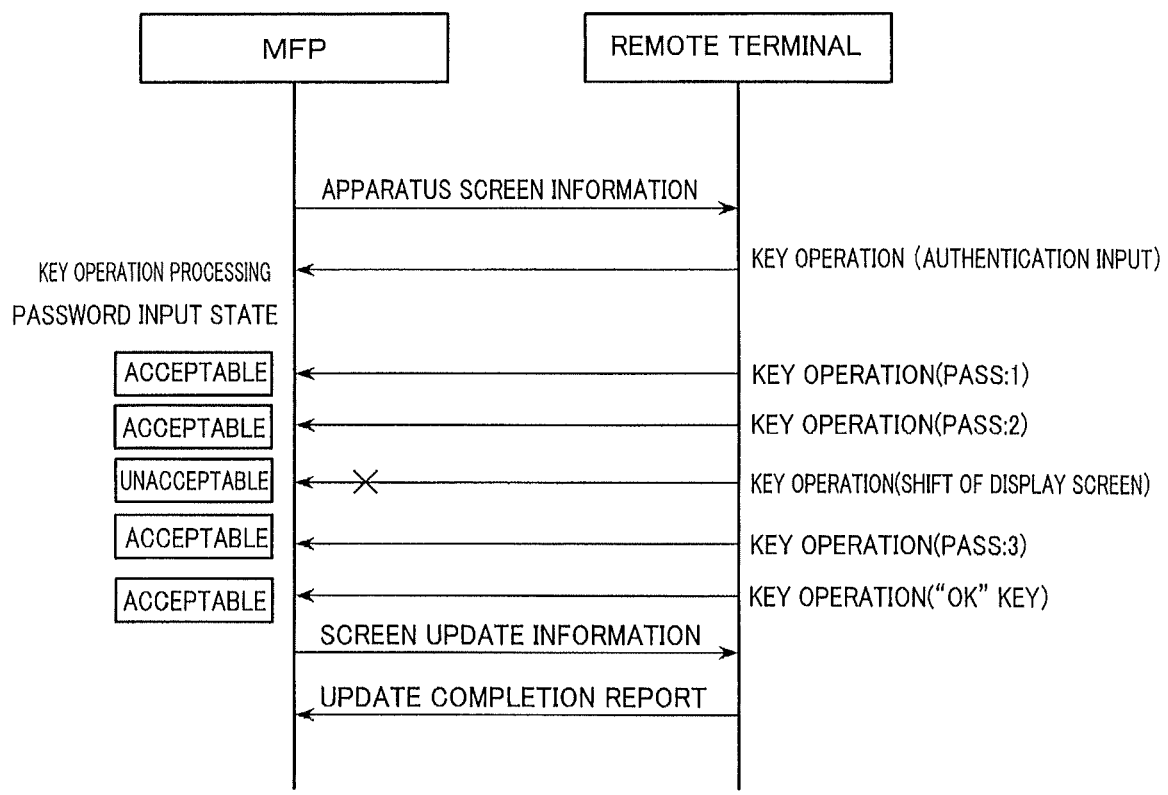
FIG. 12 is a sequence diagram showing communication between MFP 100 and remote terminal 200 in a case of adopting a third decision method.

FIG. 12 is a sequence diagram showing communication between MFP 100 and remote terminal 200 in the case of adopting the third decision method.

With reference to FIG. 12, MFP 100 transmits, to remote terminal 200, screen information (apparatus screen information) on a screen displayed on operation panel 107. Remote terminal 200 displays, on display unit 206, a screen in accordance with the screen information thus received.

When remote terminal 200 receives, from a user, a key operation to request display of a login screen in a mode for an administrator who administers MFP 100 (administrator mode) or a login screen for a user of MFP 100, remote terminal 200 transmits information on the key operation thus received (information on the first operation) to MFP 100.

Upon receipt of the information on the operation from remote terminal 200, MFP 100 executes processing in accordance with the received information on the operation (key operation processing), so as to come into a state for awaiting input of a login password (password input state). Assume a case where MFP 100 receives, from remote terminal 200, information on a subsequent operation (information on the second operation) while preparing information on a screen updated due to the processing (updated screen for awaiting input of a password). In this case, if the information on the subsequent operation relates to an operation to a numeric key or an alphabet key, MFP 100 executes processing in accordance with the information on the operation, It is because a password generally includes an alphabet and/or a number. For example, upon receipt of information on an operation to a numeric key such as "1", "2", or "3", MFP 100 receives the corresponding number as input to a column of a password in an updated screen. On the other hand, if the information on the subsequent operation relates to an operation not relevant to an alphabet or a number (shift of a display screen, for example), MFP 100 cancels the processing in accordance with the information on the subsequent operation.

Upon completion of the key operation processing in accordance with the received information on the operation, MFP 100 transmits, to remote terminal 200, information on a screen updated due to the processing in accordance with the received information on the operation (screen update information). For example, upon receipt of information on the operations to the numeric keys of "1", "2", and "3", MFP 100 transmits information on a screen updated by inputting the numbers "123" to the input column of a password. Remote terminal 200 displays, on display unit 206, a screen updated in accordance with the screen update information thus received, and transmits, to MFP 100, an update completion report of reporting that the updated screen is displayed on remote terminal 200. MFP 100 completes the key operation processing upon receipt of an operation completion report from remote terminal 200. If MFP 100 receives information on an operation to neither an alphabet key nor a numeric key after the receipt of the operation completion report, MFP 100 executes processing in accordance with the information.

Described next is an exemplary flowchart of operations of MFP 100 in the case of adopting the third decision method.

In the case of adopting the third decision method, a flowchart showing main routine of the operations of MFP 100 and a flowchart showing the operations of remote terminal 200 are the same as those shown in FIGS. 5 and 8, respectively. Therefore, the same details will not be repeated herein.

Figure 13:
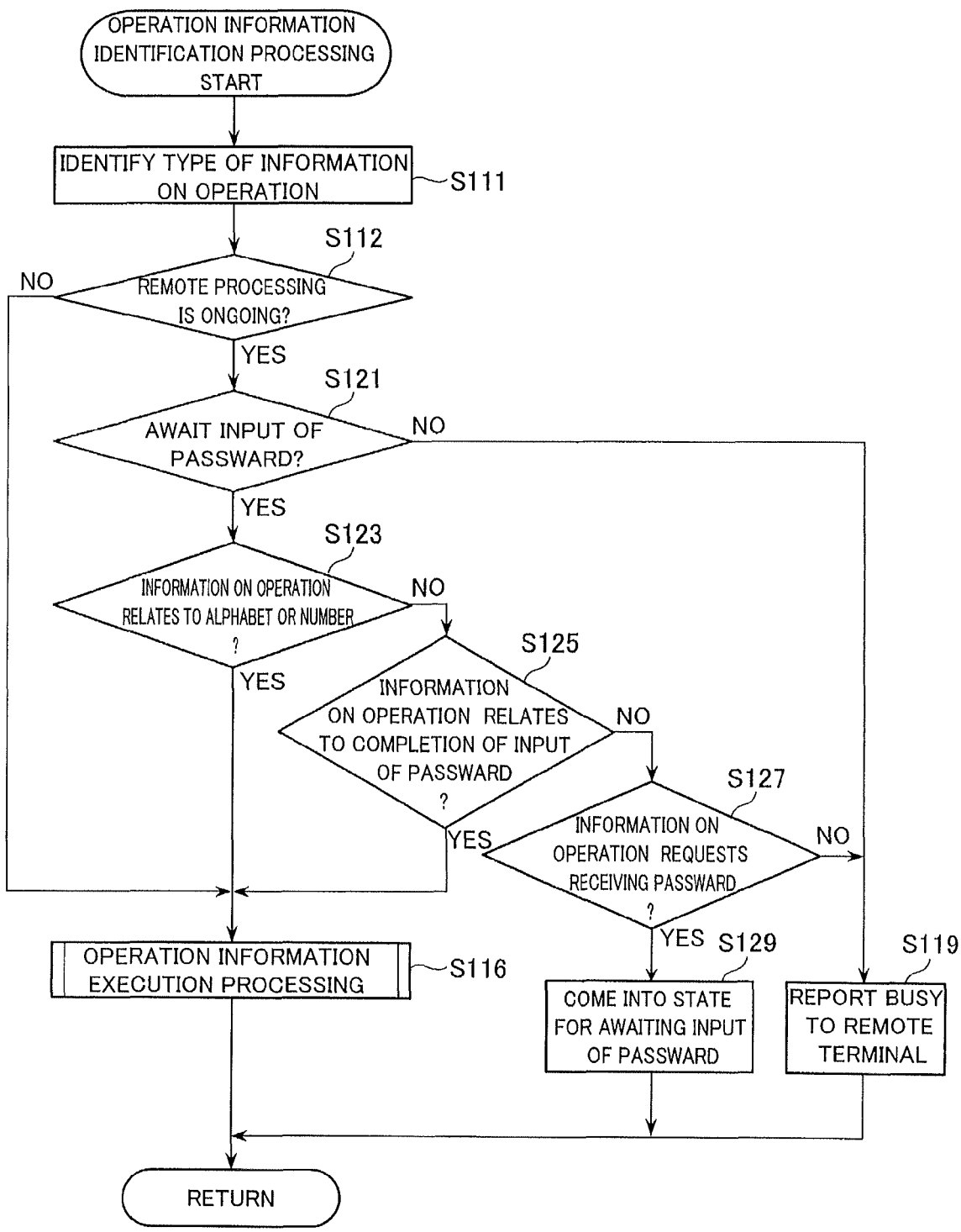
FIG. 13 shows sub routine in step S4 of FIG. 5 in the third decision method.

FIG. 13 shows sub routine in step S4 of FIG. 5 in the third decision method.

With reference to FIG. 13, in the operation information identification processing in step S4, CPU 101 identifies the type of information on an operation (S111), and determines whether or not remote processing is ongoing by referring to a remote processing ongoing flag (S112).

If determined that remote processing is ongoing in step S112 (YES in S112), CPU 101 determines whether or not MFP 100 is in a state for awaiting input of a password (S121). On the other hand, if determined that remote processing is not ongoing in step S112 (NO in S112), CPU 101 proceeds to the processing in step S116.

If determined that MFP 100 is in a state for awaiting input of a password in step S121 (YES in S121), CPU 101 determines whether or not the received information on the operation relates to an operation to any alphabet key or any numeric key (S123).

If determined that the received information on the operation relates to an operation to any alphabet key or any numeric key in step S123 (YES in S123), CPU 101 executes the operation information execution processing shown in FIG. 11 (S116), and then returns. On the other hand, if determined that the received information on the operation does not relate to an operation to any alphabet key or any numeric key (NO in S123), CPU 101 determines whether or not the information on the operation indicates completion of input of a password (S125).

If determined that the information on the operation indicates completion of input of a password in step S125 (YES in S125), CPU 101 proceeds to the processing in step S116. On the other hand, if determined that the information on the operation does not indicate completion of input of a password in step S125 (NO in S125), CPU 101 determines whether or not the information on the operation requests receipt of a password (S127).

If determined that the information on the operation requests receipt of a password in step S127 (YES in S127), CPU 101 comes into a state for awaiting input of a password (S129), and then returns.

If determined that MFP 100 is not in a state for awaiting input of a password in step S121 (NO in S121), or if determined that the information on the operation does not request receipt of a password in step S127 (NO in S127), CPU 101 cancels the processing in accordance with the information on the operation, reports to remote terminal 200 that MFP 100 is busy (S119), and then returns.

[Fourth Decision Method]

In some cases, an image forming apparatus such as an MFP has a set operation to be executed upon input of a specific character string (command) in a state for awaiting input of a command. The image forming apparatus may be brought into a state for awaiting a command by long press of a stop button on an operation panel, for example. In the case where the image forming apparatus is in a state for awaiting a command, upon receipt of input of a correct password including specific alphabets and numbers, the image forming apparatus may transit the screen on the operation panel to a screen in a check mode for a service person, or may execute sample printing.

In the fourth decision method, in a case where MFP 100 awaits input of a command having a character string for giving some order to MFP 100, if the information on the second operation relates to an input operation of at least one of any number and any alphabet, MFP 100 decides to execute the processing in accordance with the information on the second operation.

Described below is an exemplary flowchart of operations of MFP 100 in the case of adopting the fourth decision method.

In the case of adopting the fourth decision method, a flowchart showing main routine of the operations of MFP 100 and a flowchart showing the operations of remote terminal 200 are the same as those shown in FIGS. 5 and 8, respectively. Therefore, the same details will not be repeated herein.

Figure 14:
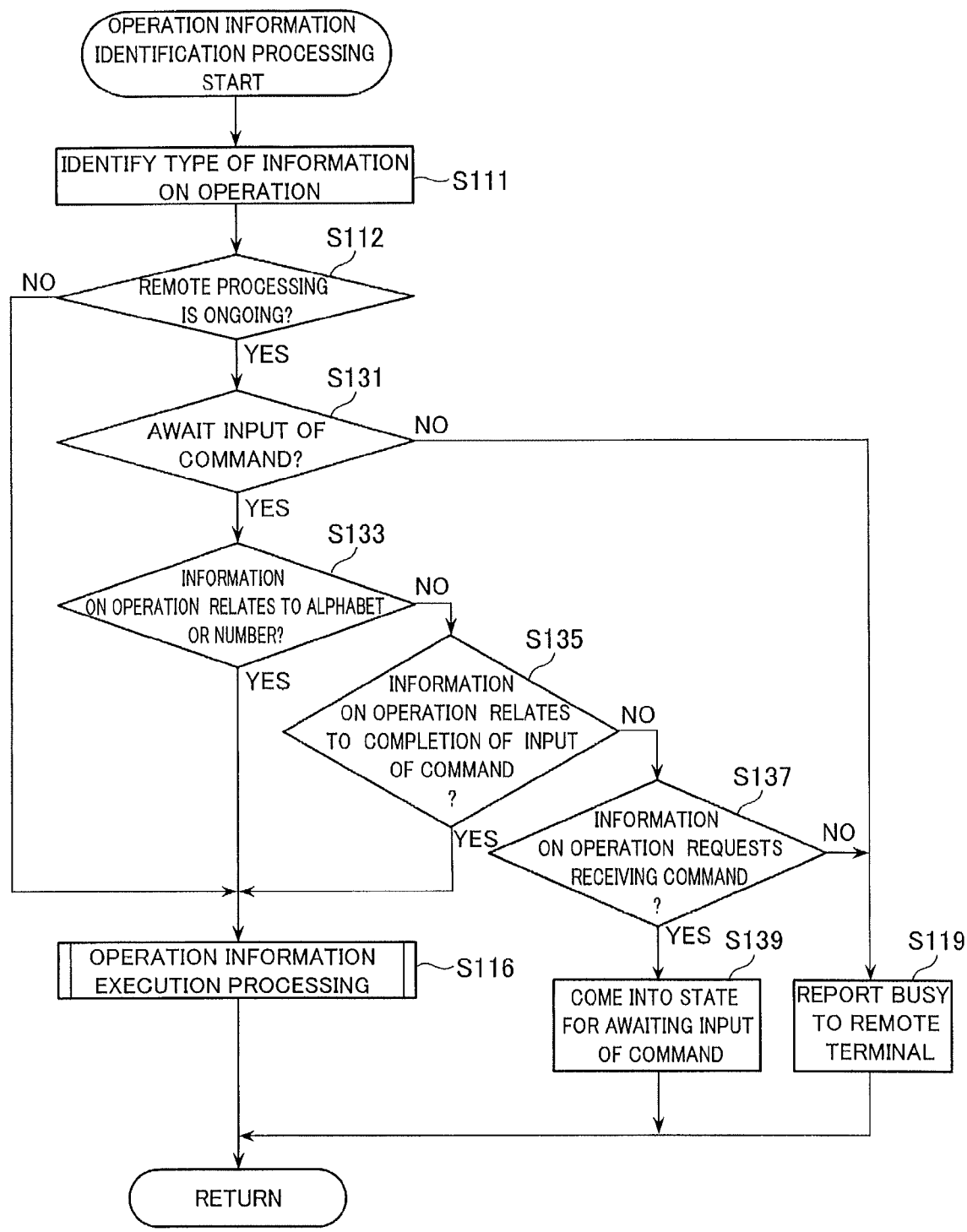
FIG. 14 shows sub routine in step S4 of FIG. 5 in a fourth decision method.

FIG. 14 shows sub routine in step S4 of FIG. 5 in the fourth decision method.

With reference to FIG. 14, in the operation information identification processing in step S4, CPU 101 identifies the type of information on an operation (S111), and determines whether or not remote processing is ongoing by referring to a remote processing ongoing flag (S112).

If determined that remote processing is ongoing in step S112 (YES in S112), CPU 101 determines whether or not MFP 100 is in a state for awaiting input of a command (S131). On the other hand, if determined that remote processing is not ongoing in step S112 (NO in S112), CPU 101 proceeds to the processing in step S116.

If determined that MFP 100 is in a state for awaiting input of a command in step S131 (YES in S131), CPU 101 determines whether or not the received information on the operation relates to an operation to any alphabet key or any numeric key (S133).

If determined that the received information on the operation relates to an operation to any alphabet key or any numeric key in step S133 (YES in S133), CPU 101 executes the operation information execution processing shown in FIG. 11 (S116), and then returns. On the other hand, if determined that the received information on the operation does not relate to an operation to any alphabet key or any numeric key (NO in S133), CPU 101 determines whether or not the information on the operation indicates completion of input of a command (S135).

If determined that the information on the operation indicates completion of input of a command in step S135 (YES in S135), CPU 101 proceeds to the processing in step S116. On the other hand, if determined that the information on the operation does not indicate completion of input of a command in step S135 (NO in S135), CPU 101 determines whether or not the information on the operation requests receipt of a command (S137).

If determined that the information on the operation requests receipt of a command in step S137 (YES in S137), CPU 101 comes into a state for awaiting input of a command (S139), and then returns.

If determined that MFP 100 is not in a state for awaiting input of a command in step S131 (NO in S131), or if determined that the information on the operation does not request receipt of a command in step S137 (NO in S137), CPU 101 cancels the processing in accordance with the information on the operation, reports to remote terminal 200 that MFP 100 is busy (S119), and then returns.

[Fifth Decision Method]

In the fifth decision method and a sixth decision method to be described later, MFP 100 decides whether to execute or cancel the processing in accordance with the information on the second operation, further depending on whether or not an error occurs in MFP 100 when said image forming device receives the information on the second operation from remote terminal 200. Particularly in the fifth decision method, in a case where MFP 100 receives the information on the second operation from remote terminal 200, if any error such as a sheet jam or lack of a sheet occurs in MFP 100, MFP 100 decides to cancel the processing in accordance with the information on the second operation.

Each of the fifth and sixth decision methods is combined with any one of the first to fourth decision methods and seventh to tenth decision methods. Described herein is a case where each of the fifth and sixth decision methods is combined with the first decision method.

Figure 15:
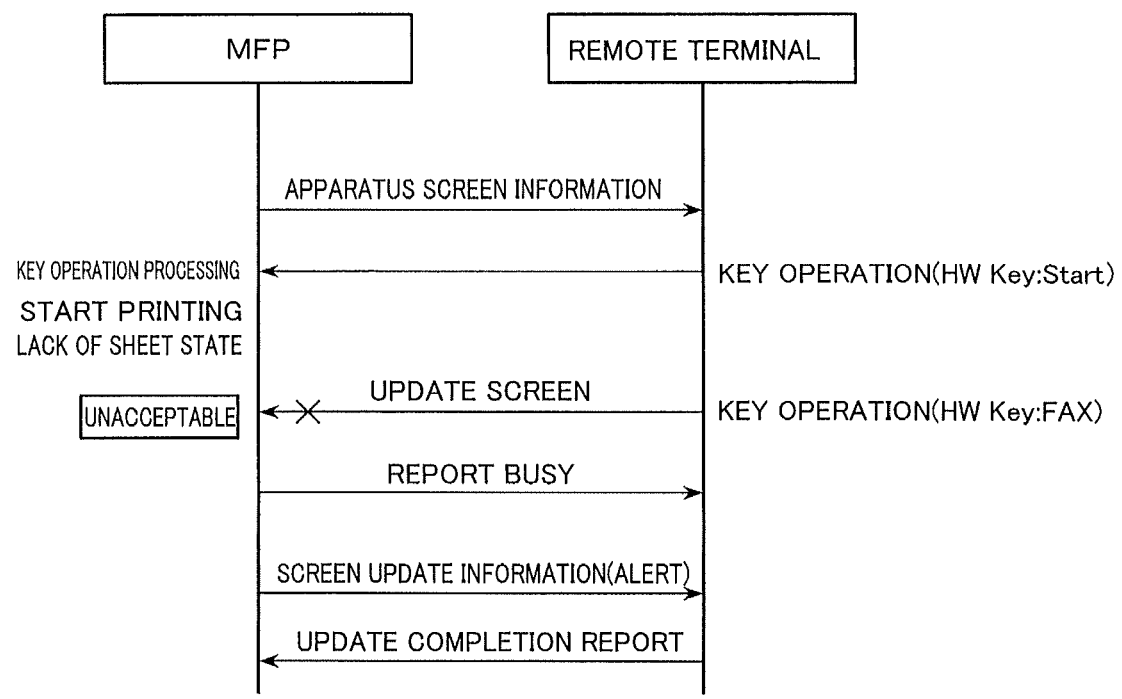
FIG. 15 is a sequence diagram showing communication between MFP 100 and remote terminal 200 in a case of adopting a fifth decision method.

FIG. 15 is a sequence diagram showing communication between MFP 100 and remote terminal 200 in the case of adopting the fifth decision method.

With reference to FIG. 15, MFP 100 transmits, to remote terminal 200, screen information (apparatus screen information) on a screen displayed on operation panel 107. Remote terminal 200 displays, on display unit 206, a screen in accordance with the screen information thus received.

Upon receipt, from a user, of an operation to the start key in order to execute printing, remote terminal 200 transmits information on the key operation thus received (information on the first operation) to MFP 100.

Upon receipt of the information on the operation from remote terminal 200, MFP 100 executes processing in accordance with the received information on the operation (key operation processing) to start printing. If any error occurs in MFP 100 such as lack of a sheet (shortage of a sheet) or a sheet jam (stuck of a sheet) as a result of starting printing, MFP 100 decides to cancel the processing in accordance with the information on the operation subsequently received regardless of the type of the information on the operation. Even in a case where the received information on the operation relates to execution of facsimile transmission, MFP 100 decides to cancel the processing in accordance with the information on the operation.

Upon occurrence of such an error, MFP 100 reports to remote terminal 200 that MFP 100 is busy, and transmits, to remote terminal 200, information on an updated screen (screen update information) for alerting lack of a sheet or a sheet jam. Remote terminal 200 displays, on display unit 206, a screen updated in accordance with the screen update information thus received, and transmits, to MFP 100, an update completion report of reporting that the updated screen is displayed on remote terminal 200. MFP 100 completes the key operation processing upon receipt of an operation completion report from remote terminal 200.

Described next is an exemplary flowchart of operations of MFP 100 in the case of adopting the fifth decision method.

In the case of adopting the fifth decision method, a flowchart showing main routine of the operations of MFP 100 and a flowchart showing the operations of remote terminal 200 are the same as those shown in FIGS. 5 and 8, respectively. Therefore, the same details will not be repeated herein.

Figure 16:
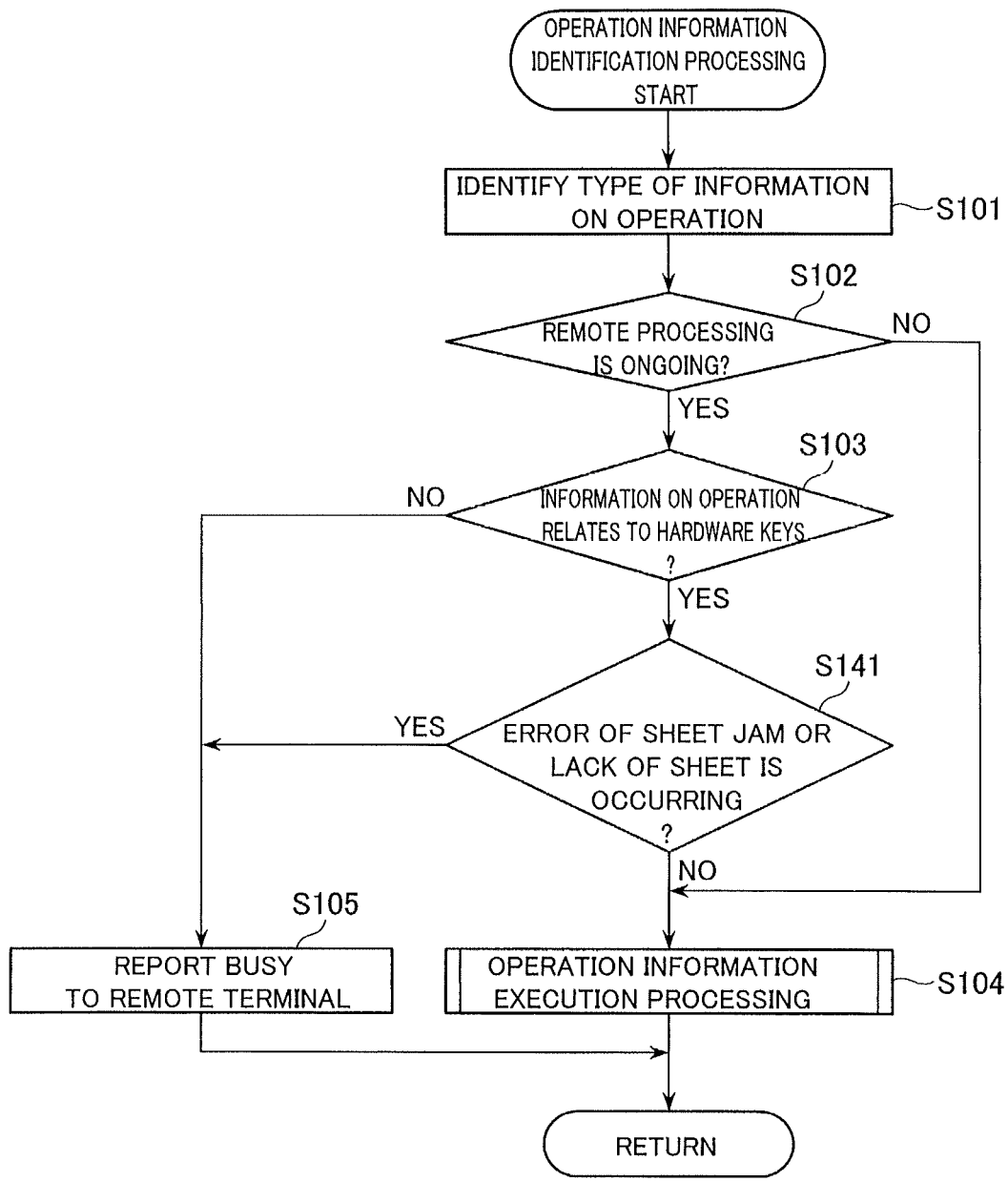
FIG. 16 shows sub routine in step S4 of FIG. 5 in the fifth decision method.

FIG. 16 shows sub routine in step S4 of FIG. 5 in the fifth decision method.

With reference to FIG. 16, in the operation information identification processing in step S4, CPU 101 identifies the type of the information on the operation (S101), and determines whether or not remote processing is ongoing by referring to a remote processing ongoing flag (S102).

If determined that remote processing is ongoing in step S102 (YES in S102), CPU 101 determines whether or not the information on the operation relates to an operation to any of the hardware keys (S103). On the other hand, if determined that remote processing is not ongoing in step S102 (NO in S102), CPU 101 proceeds to the processing in step S104.

If determined that the information on the operation relates to an operation to any of the hardware keys in step S103 (YES in step S103), CPU 101 determines whether or not an error is occurring such as a sheet jam or lack of a sheet (S141).

If determined that no error is occurring in step S141 (NO in S141), CPU 101 executes the operation information execution processing shown in FIG. 11 (S104), and then returns.

If determined that the information on the operation relates to an operation to any of the software keys in step S103 (NO in S103), or if determined that an error is occurring in step S141 (YES in S141), CPU 101 cancels the processing in accordance with the information on the operation, reports to remote terminal 200 that MFP 100 is busy (S105), and then returns.

[Sixth Decision Method]

Assume, in a state where MFP 100 is awaiting input of an adjustment value in the numeric range from 1 to 100 such as brightness of a screen on operation panel 107, that MFP 100 receives information on an operation to input a numeric value of 2000 out of the range. Or assume, in a state where MFP 100 is awaiting setting of a printing mode, that MFP 100 receives information on an operation relevant to setting including unacceptable combination of a two-in-one mode and a scale-up/sale-down mode, for example. In such a case, an error occurs to the information on the operation.

In the sixth decision method, if there occurs an error to the information on the operation received by MFP 100, MFP 100 decides to cancel the processing in accordance with the information on the second operation.

Described below is an exemplary flowchart of operations of MFP 100 in the case of adopting the sixth decision method.

In the case of adopting the sixth decision method, a flowchart showing main routine of the operations of MFP 100 and a flowchart showing the operations of remote terminal 200 are the same as those shown in FIGS. 5 and 8, respectively. Therefore, the same details will not be repeated herein.

Figure 17:
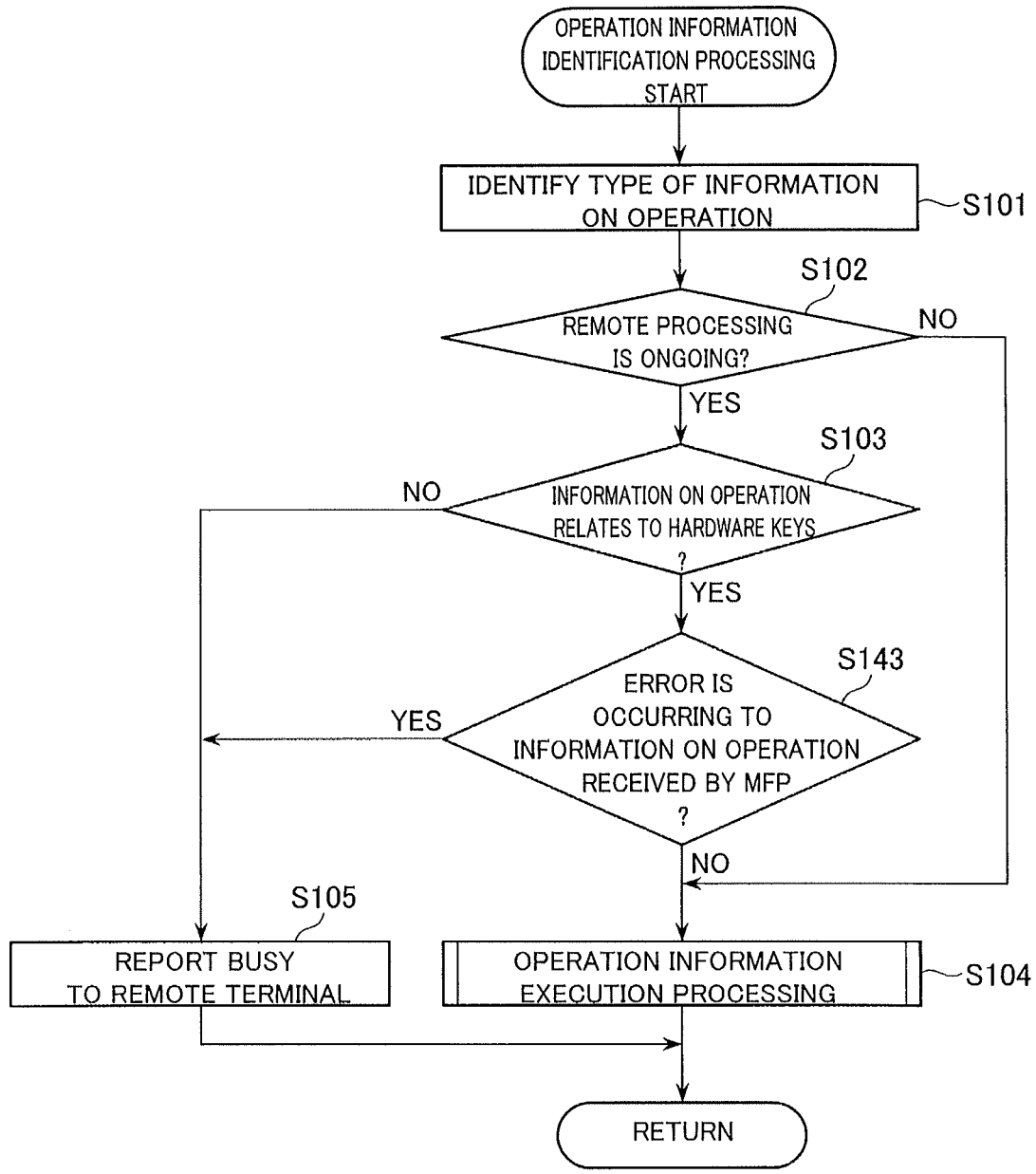
FIG. 17 shows sub routine in step S4 of FIG. 5 in a sixth decision method.

FIG. 17 shows sub routine in step S4 of FIG. 5 in the sixth decision method.

With reference to FIG. 17, in the operation information identification processing in step S4, CPU 101 identifies the type of the information on the operation (S101), and determines whether or not remote processing is ongoing by referring to a remote processing ongoing flag (S102).

If determined that remote processing is ongoing in step S102 (YES in S102), CPU 101 determines whether or not the information on the operation relates to an operation to any of the hardware keys (S103). On the other hand, if determined that remote processing is not ongoing in step S102 (NO in S102), CPU 101 proceeds to the processing in step S104.

If determined that the information on the operation relates to an operation to any of the hardware keys in step S103 (YES in step S103), CPU 101 determines whether or not an error is occurring to the information on the operation received by MFP 100 (S143).

If determined that no error is occurring in step S143 (NO in S143), CPU 101 executes the operation information execution processing shown in FIG. 11 (S104), and then returns.

If determined that the information on the operation relates to an operation to any of the software keys in step S103 (NO in S103), or if determined that an error is occurring in step S143 (YES in S143), CPU 101 cancels the processing in accordance with the information on the operation, reports to remote terminal 200 that MFP 100 is busy (S105), and then returns.

[Seventh Decision Method]

In the seventh and eighth decision methods, MFP 100 decides whether to execute or cancel the processing in accordance with the information on the second operation further depending on the type of the information on the first operation. Particularly in the seventh decision method, assume a case where the information on the first operation relates to a first touch for selecting an option displayed on a screen on remote terminal 200. If the information on the second operation relates to a second touch for instructing processing by touching again the option selected by the first touch, MFP 100 decides to execute the processing in accordance with the information on the second operation.

Figure 18:
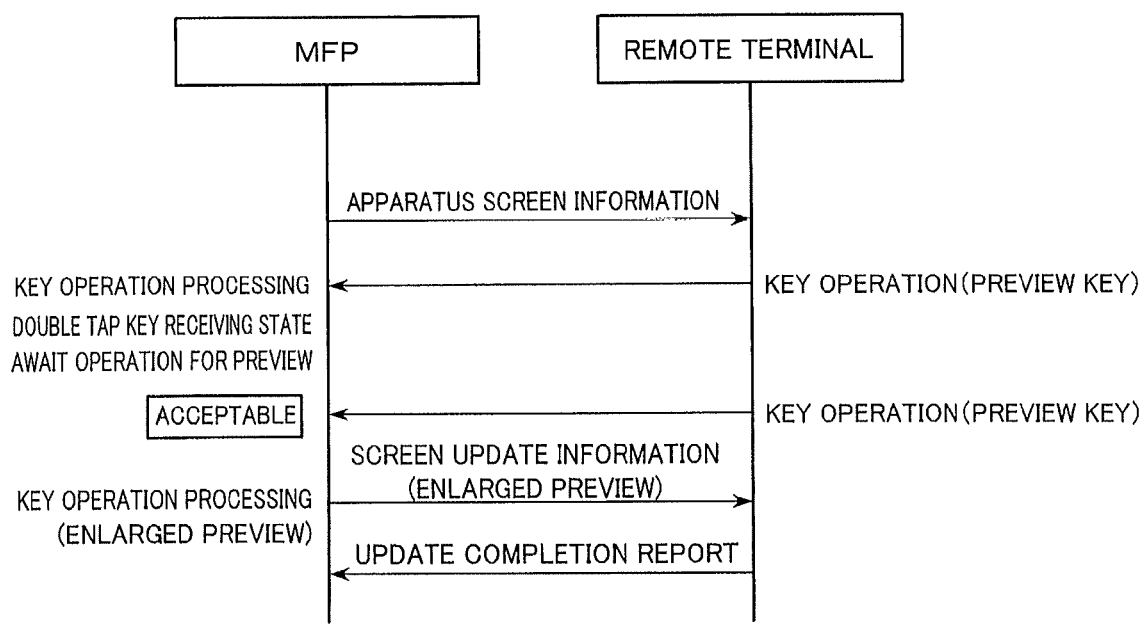
FIG. 18 is a sequence diagram showing communication between MFP 100 and remote terminal 200 in a case of adopting a seventh decision method.

FIG. 18 is a sequence diagram showing communication between MFP 100 and remote terminal 200 in the case of adopting the seventh decision method.

With reference to FIG. 18, MFP 100 transmits, to remote terminal 200, screen information (apparatus screen information) on a screen displayed on operation panel 107. Remote terminal 200 displays, on display unit 206, a screen in accordance with the screen information thus received.

Upon receipt, from a user, of a key operation of touching a position in an area to receive processing by successive touches in a screen on display unit 206, remote terminal 200 transmits information on the key operation thus received (information on the first operation) to MFP 100.

Upon receipt of the information on the operation from remote terminal 200, MFP 100 executes processing in accordance with the received information on the operation (key operation processing), so as to come into a state for awaiting information on an operation to input by a subsequent touch (double tap key receiving state). Assume a case where MFP 100 receives, from remote terminal 200, information on a subsequent operation (information on the second operation) while preparing information on a screen updated due to the processing (updated screen due to the first touch). In this case, if the information on the subsequent operation relates to a key operation of touching again a position in the area to receive processing by successive touches (in a coordinate area of double taps), MFP 100 executes processing in accordance with the information on the operation. If the information on the subsequent operation relates to a key operation of touching a position outside the coordinate area of double taps, MFP 100 may execute processing at the coordinate position of the touch, or may cancel the processing in accordance with the information on the touch operation.

For example, assume a case where, when operation panel 107 displays a plurality of preview images on display unit 206 (in a preview display screen), operation panel 107 is an interface for displaying in a larger scale a specific preview image upon receipt of successive touches to the preview image. When MFP 100 receives, from remote terminal 200, information on an operation of touching a position in an area where the specific preview image is displayed as the information on the first operation, if MFP 100 receives a key operation of touching again a position in the area where the specific preview image is displayed as the information on the second operation, MFP 100 executes processing of displaying the specific image in a larger scale.

Described next is an exemplary flowchart of operations of MFP 100 in the case of adopting the seventh decision method.

In the case of adopting the seventh decision method, a flowchart showing main routine of the operations of MFP 100 and a flowchart showing the operations of remote terminal 200 are the same as those shown in FIGS. 5 and 8, respectively. Therefore, the same details will not be repeated herein.

Figure 19:
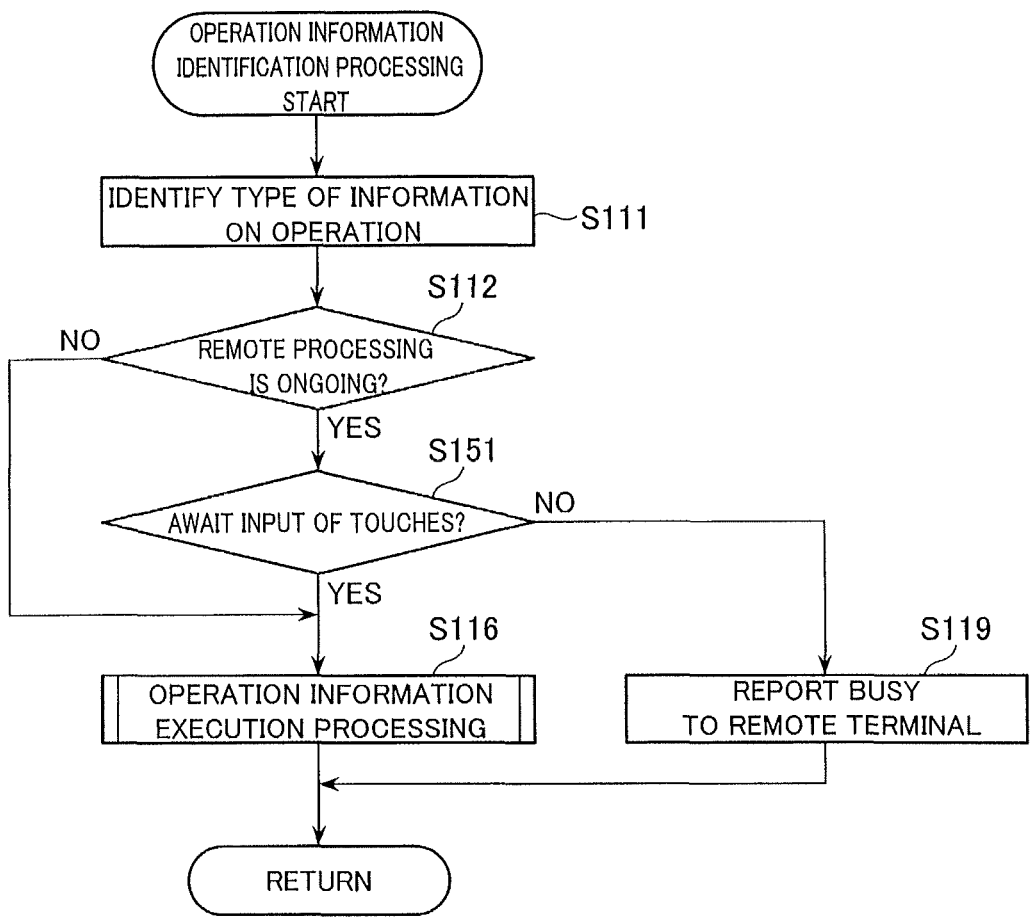
FIG. 19 shows sub routine in step S4 of FIG. 5 in the seventh decision method.

FIG. 19 shows sub routine in step S4 of FIG. 5 in the seventh decision method.

With reference to FIG. 19, in the operation information identification processing in step S4, CPU 101 identifies the type of information on an operation (S111), and determines whether or not remote processing is ongoing by referring to a remote processing ongoing flag (S112).

If determined that remote processing is ongoing in step S112 (YES in S112), CPU 101 determines whether or not MFP 100 is in a state for awaiting input of a plurality of touches (S151). On the other hand, if determined that remote processing is not ongoing in step S112 (NO in S112), CPU 101 proceeds to the processing in step S116 shown in FIG. 20.

Figure 20:
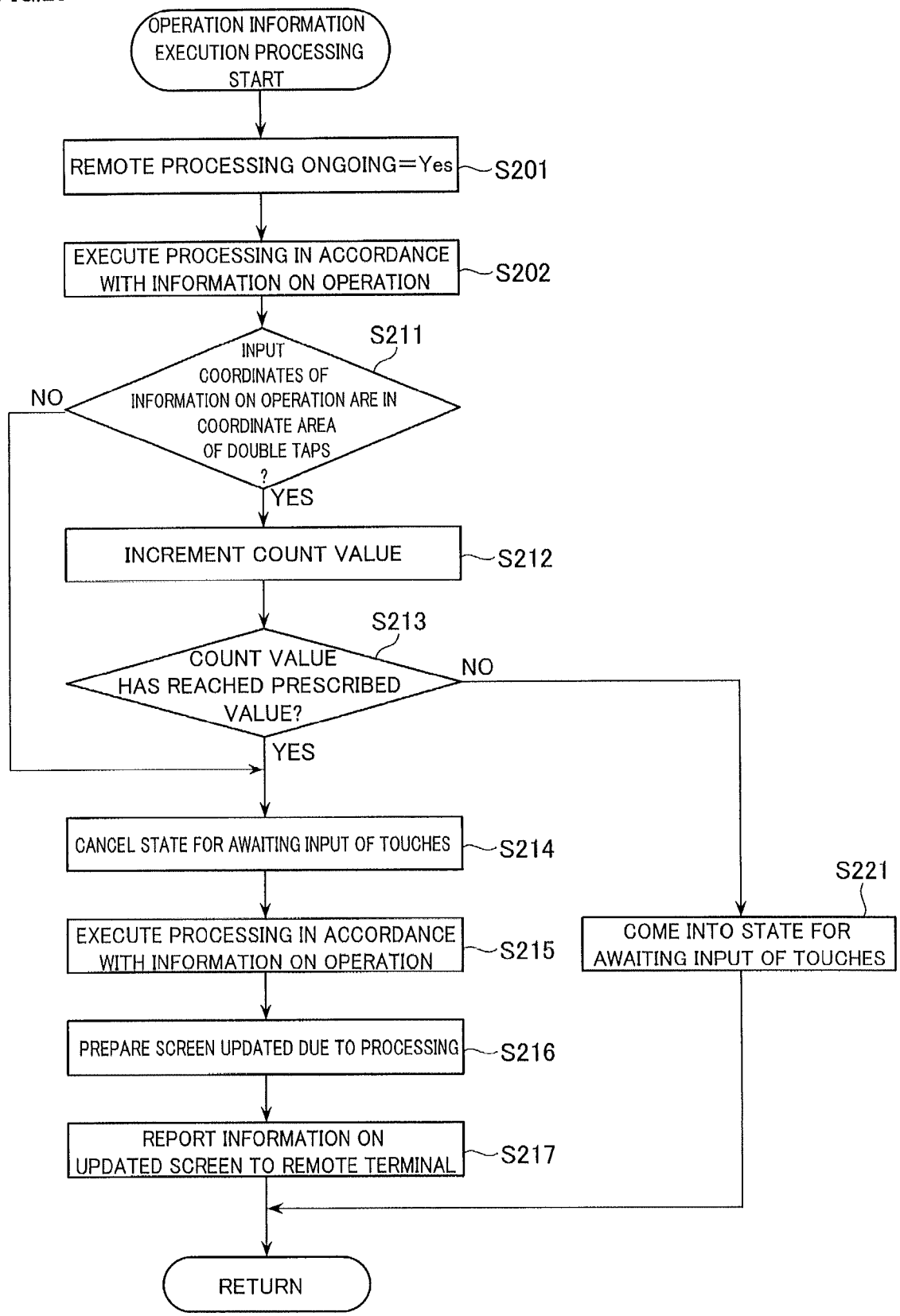
FIG. 20 shows sub routine in step S116 of FIG. 19.

If determined that MFP 100 is in a state for awaiting input of a plurality of touches in step S151 (YES in S151), CPU 101 proceeds to the processing in step S116 shown in FIG. 20. On the other hand, if determined that MFP 100 is not in a state for awaiting input of a plurality of touches in step S151 (NO in S151), CPU 101 cancels the processing in accordance with the information on the operation, reports to remote terminal 200 that MFP 100 is busy (S119), and then returns.

FIG. 20 shows sub routine in step S116 of FIG. 19.

With reference to FIG. 20, in the operation information execution processing in step S116, CPU 101 sets a remote processing ongoing flag (S201), and executes the processing in accordance with the information on the operation (S202). Subsequently, CPU 101 determines whether or not input coordinates of the information on the operation are in the coordinate area of double taps (S211).

If determined that the input coordinates are in the coordinate area of double taps in step S211 (YES in S211), CPU 101 increments a count value on the number of touches stored in RAM 102 or the like (S212), and determines whether or not the count value on the number of touches has reached a prescribed value (S213).

If determined that the count value has reached the prescribed value in step S213 (YES in S213), CPU 101 proceeds to processing in step S214. If determined that the input coordinates are outside the coordinate area of double taps in step S211 (NO in S211), CPU 101 proceeds to the processing in step S214.

In step S214, CPU 101 cancels the state for awaiting input of a plurality of touches (S214), and executes processing in accordance with the information on the operation (S215). Subsequently, CPU 101 prepares a screen updated due to the processing (S216), reports information on the updated screen to remote terminal 200 (S217), and then returns.

If determined that the count value has not reached the prescribed value in step S213 (NO in S213), CPU 101 comes into a state for awaiting input of a plurality of touches (S221), and then returns.

[Eighth Decision Method]

In the eighth decision method, in a case where the information on the first operation corresponds to part of an instruction for script processing which is a processing having a batch of setting information for execution of specific processing, if the information on the second operation corresponds to another part of the instruction for the script processing, MFP 100 decides to execute the processing in accordance with the information on the second operation.

Figure 21:
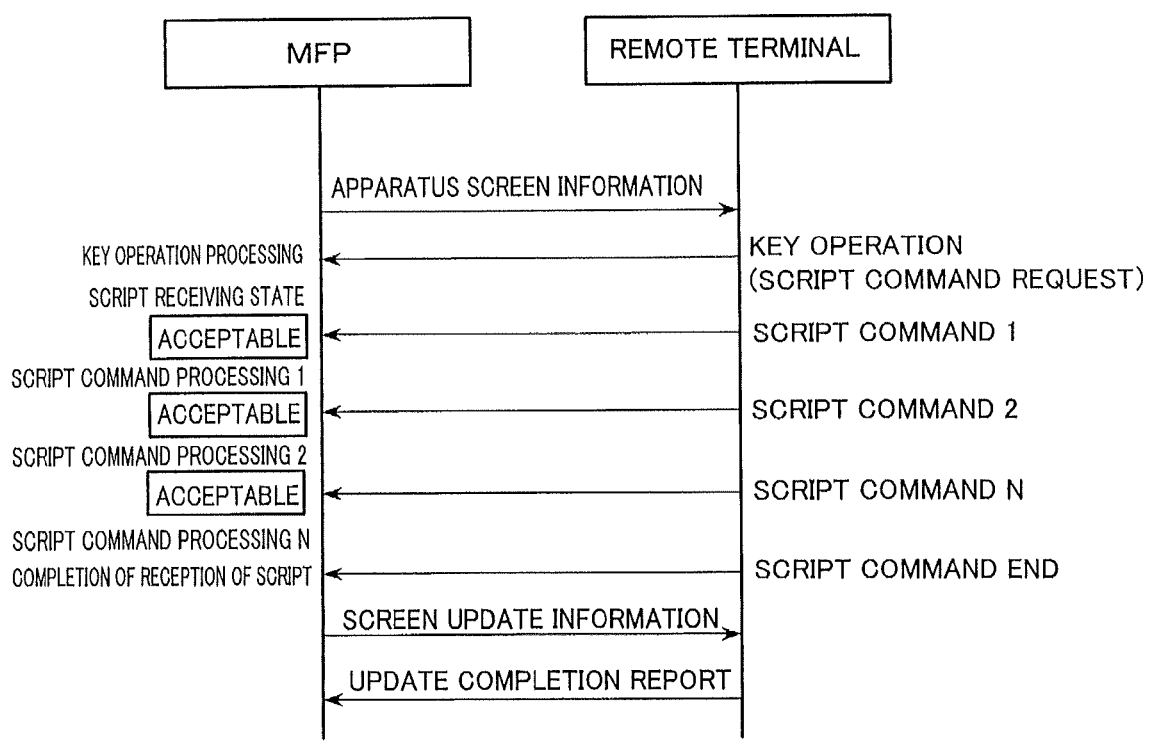
FIG. 21 is a sequence diagram showing communication between MFP 100 and remote terminal 200 in a case of adopting an eighth decision method.

FIG. 21 is a sequence diagram showing communication between MFP 100 and remote terminal 200 in the case of adopting the eighth decision method.

With reference to FIG. 21, MFP 100 transmits, to remote terminal 200, screen information (apparatus screen information) on a screen displayed on operation panel 107. Remote terminal 200 displays, on display unit 206, a screen in accordance with the screen information thus received.

In some cases, remote terminal 200 has a preliminarily registered job, such as facsimile transmission to a specific addressee. In such a case, a user has only to perform a specific operation to remote terminal 200 in order to cause MFP 100 to automatically execute the registered job.

Upon receipt of a specific operation from a user, remote terminal 200 transmits, to MFP 100, information on an operation to bring into a state for awaiting a series of script commands relevant to the registered job (commands to select an addressee, to select data to be sent by facsimile, to send, and the like) (script command request) (information on the first operation).

Upon receipt of the information on the operation from remote terminal 200, MFP 100 comes into a state for awaiting a script command (script receiving state). In a case where MFP 100 is in a state for awaiting a script command, if MFP 100 successively receives, from remote terminal 200, a series of script commands 1 to N (N is a natural number) (information on the second operation), MFP 100 executes processing in accordance with each of the script commands 1 to N (script processing 1 to N). In a case where MFP 100 is in a state for awaiting a script command, if MFP 100 receives information on an operation other than a script command, MFP 100 cancels the processing in accordance with the information on the operation.

Figure 22:
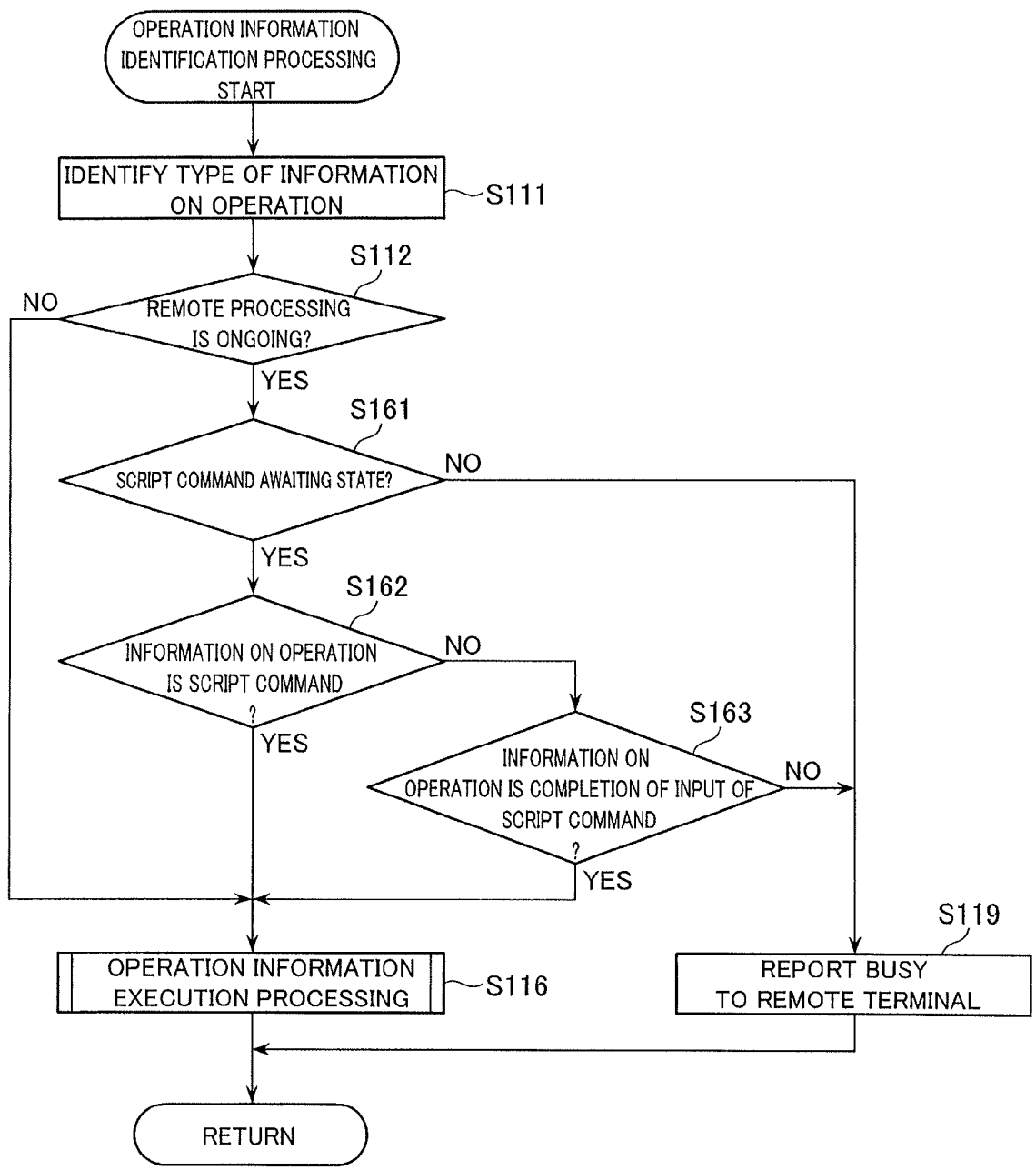
FIG. 22 shows sub routine in step S4 of FIG. 5 in the eighth decision method.

FIG. 22 shows sub routine in step S4 of FIG. 5 in the eighth decision method.

With reference to FIG. 22, in the operation information identification processing in step S4, CPU 101 identifies the type of information on an operation (S111), and determines whether or not remote processing is ongoing by referring to a remote processing ongoing flag (S112).

If determined that remote processing is ongoing in step S112 (YES in S112), CPU 101 determines whether or not MFP 100 is in a state for awaiting a script command (S161). On the other hand, if determined that remote processing is not ongoing in step S112 (NO in S112), CPU 101 proceeds to the processing in step S116 shown in FIG. 11, and then returns.

If determined that MFP 100 is in a state for awaiting a script command in step S161 (YES in S161), CPU 101 determines whether or not the received information on the operation is a script command (S162).

If determined that the received information on the operation is a script command in step S162 (YES in S162), CPU 101 executes the processing in step S116 shown in FIG. 11, and then returns. On the other hand, if determined that the received information on the operation is not a script command in step S162 (NO in S162), CPU 101 determines whether or not the received information on the operation indicates completion of input of a script command (S163).

If determined that the received information on the operation indicates completion of input of a script command in step S163 (YES in S163), CPU 101 executes the processing in step S116 shown in FIG. 11, and then returns.

If determined that MFP 100 is not in a state for receiving a script command in step S161 (NO in S161), or if determined that the received information on the operation does not indicate completion of input of a script command in step S163 (NO in S163), CPU 101 cancels the processing in accordance with the information on the operation, reports to remote terminal 200 that MFP 100 is busy (S119), and then returns.

[Ninth Decision Method]

In the ninth and tenth decision methods, MFP 100 decides whether to execute or cancel the processing in accordance with the information on the second operation further depending on the type of a screen in accordance with the information on the first operation. Particularly in the ninth decision method, in a case where the screen in accordance with the information on the first operation relates to stream data, if the information on the second operation relates to an operation relevant to execution of the stream data, MFP 100 decides to execute the processing in accordance with the information on the second operation.

Figure 23:
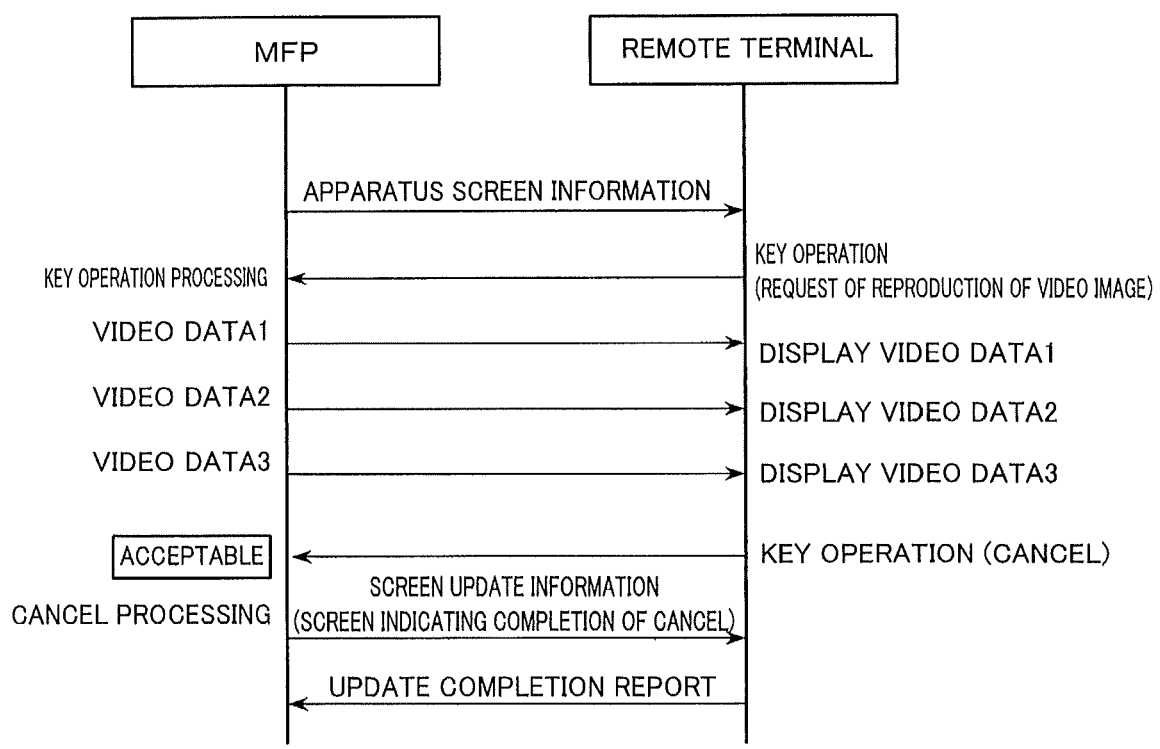
FIG. 23 is a sequence diagram showing communication between MFP 100 and remote terminal 200 in a case of adopting a ninth decision method.

FIG. 23 is a sequence diagram showing communication between MFP 100 and remote terminal 200 in the case of adopting the ninth decision method.

With reference to FIG. 23, MFP 100 transmits, to remote terminal 200, screen information (apparatus screen information) on a screen displayed on operation panel 107. Remote terminal 200 displays, on display unit 206, a screen in accordance with the screen information thus received.

Upon receipt, from a user, of a key operation to request reproduction of a video image (stream data), remote terminal 200 transmits information on the key operation thus received (information on the first operation) to MFP 100.

Upon receipt of the information on the operation from remote terminal 200, MFP 100 executes processing in accordance with the received information on the operation (key operation processing), and sequentially transmits, to remote terminal 200, information on updated screens of the video image due to execution of the processing. In a case where MFP 100 receives information on a subsequent operation (information on the second operation) from remote terminal 200 during transmission of the information on the updated screens, if the information on the subsequent operation relates to an operation relevant to execution of the video image, MFP 100 decides to execute the processing in accordance with the information on the second operation. On the other hand, if the information on the subsequent operation does not relate to an operation relevant to execution of the video image, MFP 100 cancels the processing in accordance with the information on the subsequent operation.

Assume a case where MFP 100 receives, from remote terminal 200, information on an operation to request reproduction of a video image, and receives information on an operation indicative of press of a cancel key while MFP 100 is updating (delivering) video data to remote terminal 200. In this case, MFP 100 executes processing to cancel reproduction of the video image in accordance with the information on the operation.

Figure 24:
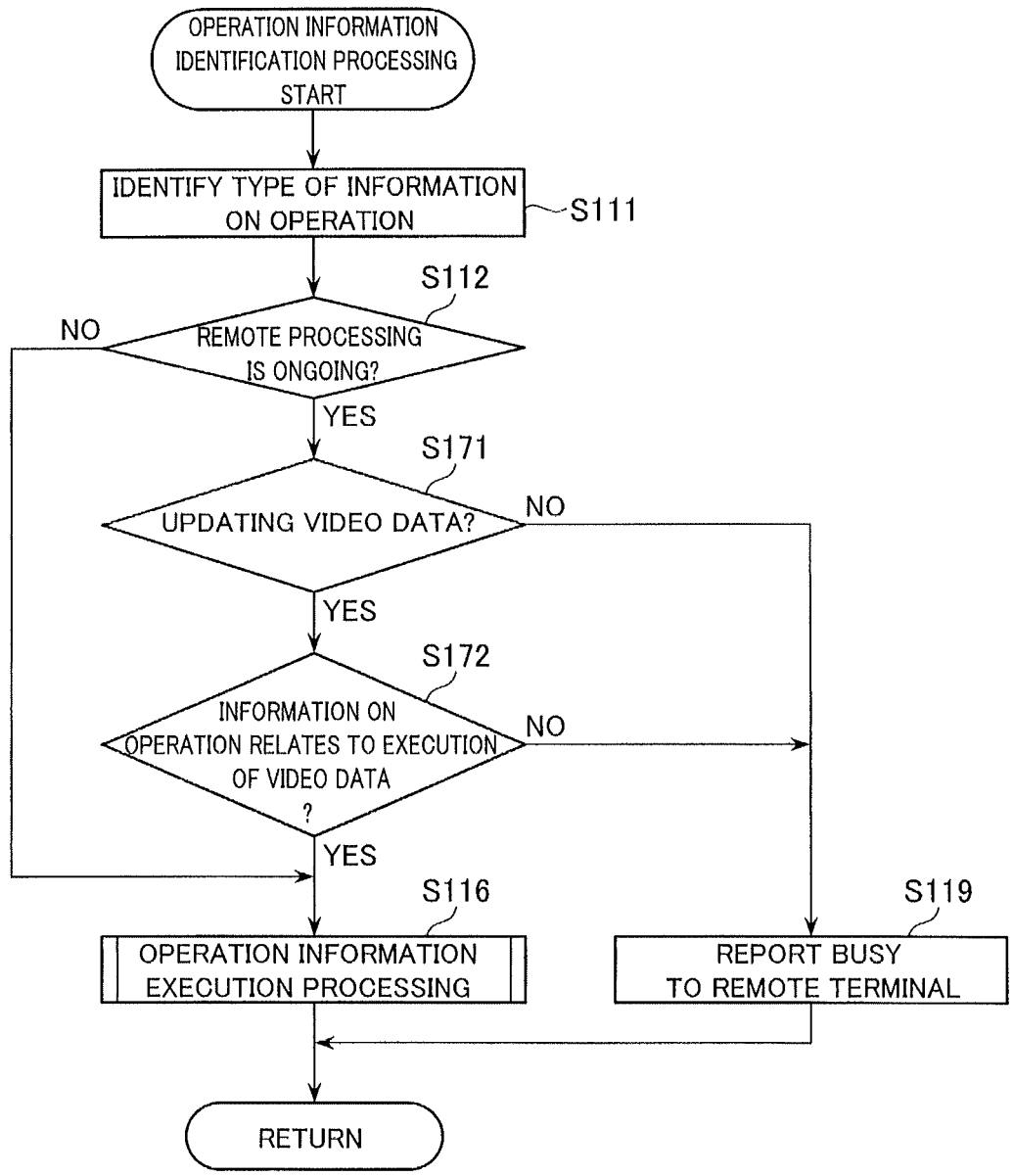
FIG. 24 shows sub routine in step S4 of FIG. 5 in the ninth decision method.

FIG. 24 shows sub routine in step S4 of FIG. 5 in the ninth decision method.

With reference to FIG. 24, in the operation information identification processing in step S4, CPU 101 identifies the type of information on an operation (S111), and determines whether or not remote processing is ongoing by referring to a remote processing ongoing flag (S112).

If determined that remote processing is ongoing in step S112 (YES in S112), CPU 101 determines whether or not MFP 100 is updating video data (S171). On the other hand, if determined that remote processing is not ongoing in step S112 (NO in S112), CPU 101 proceeds to the processing in step S116 shown in FIG. 11, and then returns.

If determined that MFP 100 is updating video data in step S171 (YES in S171), CPU 101 determines whether or not the received information on the operation relates to execution of the video data (S172). If determined that the received information on the operation relates to execution of the video data in step S172 (YES in S172), CPU 101 executes the processing in step S116 shown in FIG. 11, and then returns.

If determined that MFP 100 is not updating video data in step S171 (NO in S171), or if determined that the received information on the operation does not relate to execution of the video data in step S172 (NO in S172), CPU 101 cancels the processing in accordance with the information on the operation, reports to remote terminal 200 that MFP 100 is busy (S119), and then returns.

[Tenth Decision Method]

In the tenth decision method, in a case where a screen in accordance with, the information on the first operation needs scrolling (a screen of list data or the like), if the information on the second operation relates to an operation relevant to scrolling of a screen, MFP 100 decides to execute processing in accordance with the information on the second operation.

Figure 25:
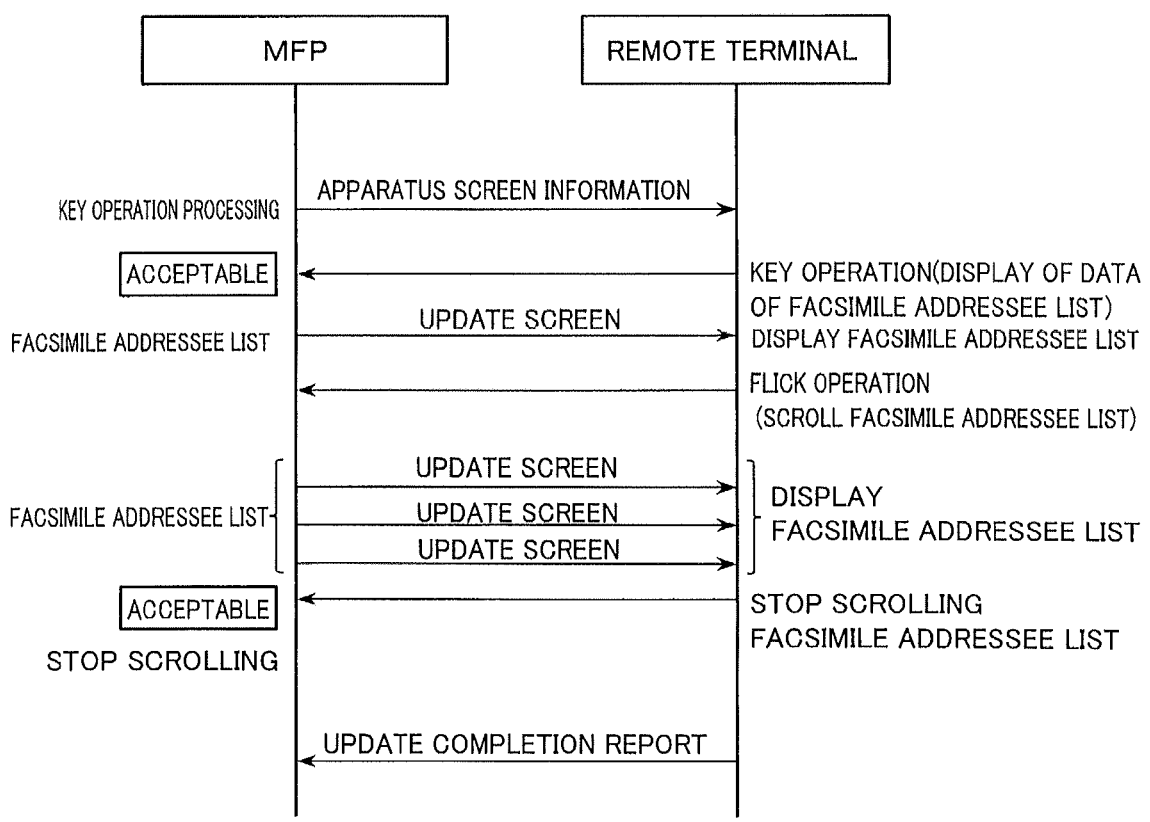
FIG. 25 is a sequence diagram showing communication between MFP 100 and remote terminal 200 in a case of adopting a tenth decision method.

FIG. 25 is a sequence diagram showing communication between MFP 100 and remote terminal 200 in the case of adopting the tenth decision method.

With reference to FIG. 25, MFP 100 transmits, to remote terminal 200, screen information (apparatus screen information) on a screen displayed on operation panel 107. Remote terminal 200 displays, on display unit 206, a screen in accordance with the screen information thus received.

Upon receipt, from a user, of a key operation to request display of data of a facsimile addressee list (list data), remote terminal 200 transmits information on the key operation thus received (information on the first operation) to MFP 100.

Upon receipt of the information on the operation from remote terminal 200, MFP 100 executes processing in accordance with the received information on the operation (key operation processing), and transmits information on a screen of the list data to remote terminal 200. Upon receipt of the information on the screen of the list data, remote terminal 200 displays, on display unit 206, a screen in accordance with the information thus received.

In a case where MFP 100 receives information on a subsequent operation from remote terminal 200 while transmitting the information on the screen of the list data, if the information on the subsequent operation relates to an operation to scroll the screen of the list data (such as a flick operation), MFP 100 decides to execute processing in accordance with the information on the operation to scroll the screen of the list data.

Along with execution of the processing in accordance with the information on the operation to scroll the screen of the list data, MFP 100 transmits information on an updated screen to remote terminal 200. In the case where MFP 100 executes the processing in accordance with the information on the scrolling operation, MFP 100 sequentially transmits, to remote terminal 200, information on a plurality of updated screens of the list data so that the screens on remote terminal 200 gradually shift from a currently displayed position to a scrolled position in the addressee list. Upon receipt of the information on the updated screens, remote terminal 200 displays, on display unit 206, the updated screens in accordance with the information thus received.

In a case where MFP 100 receives information on a subsequent operation from remote terminal 200 during transmission of the updated screens, if the information on the subsequent operation relates to an operation to stop scrolling on the screens or an operation to request display of another list data, MFP 100 decides to execute processing of stopping scrolling on the screens of the list data, and stops transmission of an updated screen or transmits, to remote terminal 200, an updated screen of the other list data. On the other hand, if the information on the subsequent operation does not relate to any of an operation to stop scrolling on the screens and an operation to request display of another list data, MFP 100 cancels the processing in accordance with the information on the operation.

Figure 26:
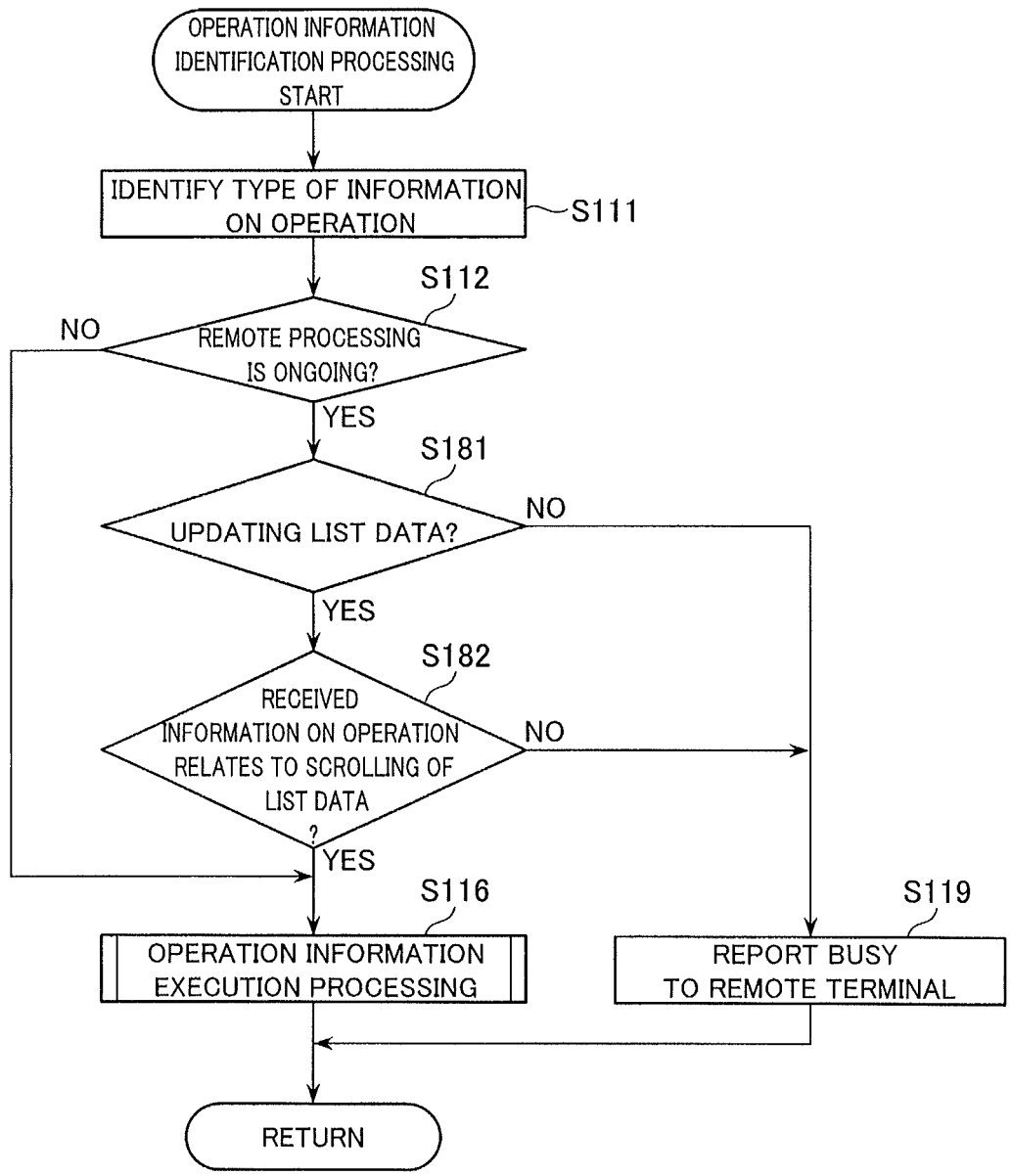
FIG. 26 shows sub routine in step S4 of FIG. 5 in the tenth decision method.
Figure 27:
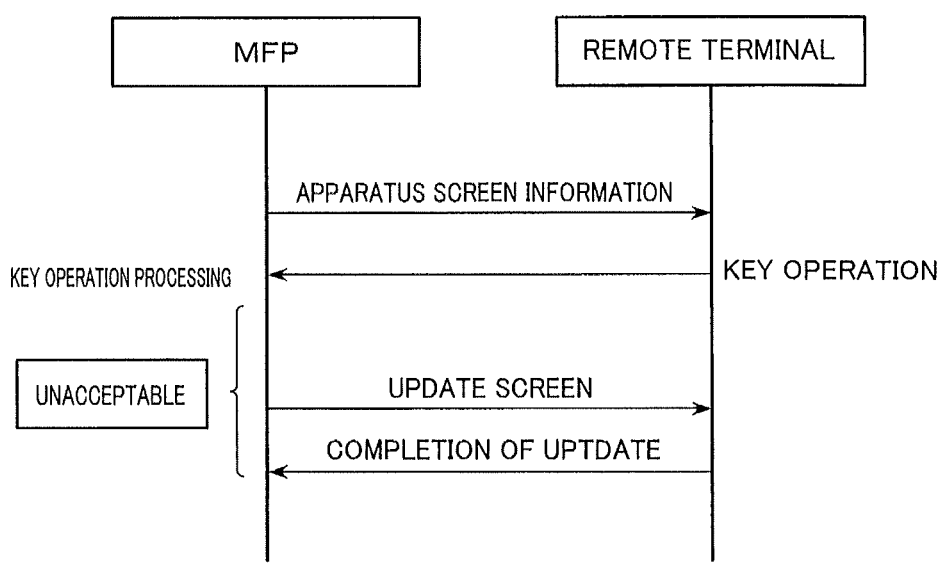
FIG. 27 is a sequence diagram showing conventional communication between an MFP having a remote panel function and a remote terminal.

FIG. 26 shows sub routine in step S4 of FIG. 5 in the tenth decision method.

With reference to FIG. 26, in the operation information identification processing in step S4, CPU 101 identifies the type of information on an operation (S111), and determines whether or not remote processing is ongoing by referring to a remote processing ongoing flag (S112).

If determined that remote processing is ongoing in step S112 (YES in S112), CPU 101 determines whether or not MFP 100 is updating list data (S181). On the other hand, if determined that remote processing is not ongoing in step S112 (NO in S112), CPU 101 proceeds to the processing in step S116 shown in FIG. 11, and then returns.

If determined that MFP 100 is updating list data in step S181 (YES in S181), CPU 101 determines whether or not the received information on the operation relates to scrolling of the list data (S182). If determined that the received information on the operation relates to scrolling of the list data in step S182 (YES in S182), CPU 101 executes the processing in step S116 shown in FIG. 11, and then returns.

If determined that MFP 100 is not updating list data in step S181 (NO in S181), or if determined that the received information on the operation does not relate to scrolling of the list data in step S182 (NO in S182), CPU 101 cancels the processing in accordance with the information on the operation, reports to remote terminal 200 that MFP 100 is busy (S119), and then returns.

Effects of the Embodiment

According to the present embodiment, it is possible to provide an image forming apparatus realizing improved operability.

According to the present embodiment, when a remote terminal for remotely operating an MFP receives successive operations to a plurality of keys from a user, operations of the MFP in accordance with received information on the operations are switched depending on the types of the received information on the operations, or the like. Therefore, while achieving succession of specific operations, it is possible to prevent an erroneous operation due to the successive operations, so as to improve operability.

Others

In the above embodiment, appropriate combination can be made. For example, the first decision method may be combined with any of the second to tenth decision methods. Still alternatively, any of the first to tenth decision methods may be adopted only partially.

The processing in the embodiment described above may be executed by software or hardware circuitry. It is also possible to provide a program used in execution of the processing in the above embodiment. A user may be provided with the program recorded on a recording medium such as a CD-ROM, a flexible disk, a hard disk, a ROM, a RAM, and a memory card. The program is to be executed by a computer such as a CPU. The program may be downloaded to an apparatus by way of communication lines such as the Internet.

Although the preset invention has been described and illustrated in detail, it is clearly understood that the same is by way of illustration and example only and is not to be taken by way of limitation, the spirit and scope of the present invention being limited only by the terms of the appended claims.

What is claimed is:

1. An image forming apparatus capable of receiving an instruction to execute processing from a remote display apparatus for displaying a screen same as a screen displayed on said image forming apparatus, the image forming apparatus comprising:
   a first operation information receiver for receiving, from said display apparatus, information on a first operation to request said image forming apparatus to execute processing;
   a transmitter for transmitting, to said display apparatus, information on a screen in accordance with said information on the first operation;

a report receiver for receiving, from said display apparatus, a report that a screen in accordance with the information transmitted from said transmitter is displayed on said display apparatus;

a second operation information receiver for receiving, from said display apparatus, information on a second operation to request said image forming apparatus to execute processing, after reception of said information on the first operation and before reception of said report; and a decision unit for deciding whether to execute or cancel the processing in accordance with said information on the second operation, depending on a type of said information on the second operation.

2. The image forming apparatus according to claim 1, wherein said decision unit decides whether to execute or cancel the processing in accordance with said information on the second operation, depending on whether or not said information on the second operation requests execution of processing for transition of a screen displayed on said display apparatus.

3. The image forming apparatus according to claim 2, wherein said decision unit decides whether to execute or cancel the processing in accordance with said information on the second operation, depending on whether or not said information on the second operation relates to an operation to a software key or an operation to a hardware key at an operation unit of said image forming apparatus.

4. The image forming apparatus according to claim 1, wherein said decision unit decides whether to execute or cancel the processing in accordance with said information on the second operation, further depending on a type of input said image forming apparatus awaits upon receipt of said information on the second operation from said display apparatus.

5. The image forming apparatus according to claim 4, wherein, in a case where said image forming apparatus awaits input of a number, if said information on the second operation relates to an operation to request input of a number, said decision unit decides to execute the processing in accordance with said information on the second operation.

6. The image forming apparatus according to claim 4, wherein, in a case where said image forming apparatus awaits input of a password, if said information on the second operation relates to an operation to input at least one of a number and an alphabet, said decision unit decides to execute the processing in accordance with said information on the second operation.

7. The image forming apparatus according to claim 4, wherein, in a case where said image forming apparatus awaits input of a command with a character string for giving an order to said image forming apparatus, if said information on the second operation relates to an operation to input at least one of a number and an alphabet, said decision unit decides to execute the processing in accordance with said information on the second operation.

8. The image forming apparatus according to claim 1, wherein said decision unit decides whether to execute or cancel the processing in accordance with said information on the second operation, further depending on presence of an error occurring in said image forming apparatus when said image forming device receives said information on the second operation from said display apparatus.

9. The image forming apparatus according to claim 8, wherein said decision unit decides to cancel the processing in accordance with said information on the second operation in a case where an error of a sheet jam or lack of a sheet occurs in said image forming apparatus.

10. The image forming apparatus according to claim 8, wherein said decision unit decides to cancel the processing in accordance with said information on the second operation upon occurrence of an error relevant to information on an operation received by said image forming apparatus.

11. The image forming apparatus according to claim 1, wherein said decision unit decides whether to execute or cancel the processing in accordance with said information on the second operation, further depending on a type of said information on the first operation.

12. The image forming apparatus according to claim 11, wherein, in a case where said information on the first operation relates to a first touch to select an option displayed on a screen of said display apparatus, if said information on the second operation relates to a second touch to instruct processing by touching the option selected at said first touch subsequently to said first touch, said decision unit decides to execute the processing in accordance with said information on the second operation.

13. The image forming apparatus according to claim 11, wherein, in a case where said information on the first operation corresponds to part of an instruction for script processing which is a processing having a batch of setting information for execution of specific processing, if the information on the second operation corresponds to another part of the instruction for the script processing, said decision unit decides to execute the processing in accordance with said information on the second operation.

14. The image forming apparatus according to claim 1, wherein said decision unit decides whether to execute or cancel the processing in accordance with said information on the second operation, further depending on a type of a screen in accordance with said information on the first operation.

15. The image forming apparatus according to claim 14, wherein, in a case where the screen in accordance with said information on the first operation relates to stream data, if said information on the second operation relates to an operation to execute said stream data, said decision unit decides to execute the processing in accordance with said information on the second operation.

16. The image forming apparatus according to claim 14, wherein, in a case where the screen in accordance with said information on the first operation needs scrolling, if said information on the second operation relates to an operation to scroll a screen, said decision unit decides to execute the processing in accordance with said information on the second operation.

17. A method of controlling an image forming apparatus that is capable of receiving an instruction to execute processing from a remote display apparatus for displaying a screen same as a screen displayed on said image forming apparatus, the method comprising:

receiving, from said display apparatus, information on a first operation to request said image forming apparatus to execute processing;

transmitting, to said display apparatus, information on a screen in accordance with said information on the first operation;

receiving, from said display apparatus, a report that a screen in accordance with the information transmitted while transmitting to said display apparatus is displayed on said display apparatus;

receiving, from said display apparatus, information on a second operation to request said image forming apparatus to execute processing, after reception of said information on the first operation and before reception of said report; and deciding whether to execute or cancel the processing in accordance with said information on the second operation, depending on a type of said information on the second operation.

18. A non-transitory computer-readable recording medium encoded with a program for controlling an image forming apparatus being capable of receiving an instruction to execute processing from a remote display apparatus for displaying a screen same as a screen displayed on said image forming apparatus, the program causing a computer to execute processing comprising:

receiving, from said display apparatus, information on a first operation to request said image forming apparatus to execute processing;

transmitting, to said display apparatus, information on a screen in accordance with said information on the first operation;

receiving, from said display apparatus, a report that a screen in accordance with the information transmitted while transmitting to said display apparatus is displayed on said display apparatus;

receiving, from said display apparatus, information on a second operation to request said image forming apparatus to execute processing, after reception of said information on the first operation and before reception of said report; and deciding whether to execute or cancel the processing in accordance with said information on the second operation, depending on a type of said information on the second operation.

19. An image forming system comprising a remote display device for displaying a screen same as a screen displayed on an image forming apparatus, and said image forming apparatus capable of receiving, from said display apparatus, an instruction to execute processing, the image forming system comprising:

a first operation information transmitter for transmitting, from said display apparatus to said image forming apparatus, information on a first operation to request said image forming apparatus to execute processing;

a transmitter for transmitting, from said image forming apparatus to said display apparatus, information on a screen in accordance with said information on the first operation;

a report transmitter for transmitting, from said display apparatus to said image forming apparatus, a report that a screen in accordance with the information transmitted by said transmitter is displayed on said display apparatus;

a second operation information transmitter for transmitting, from said display apparatus to said image forming apparatus, information on a second operation to request said image forming apparatus to execute processing, after reception of said information on the first operation and before reception of said report; and a decision unit for deciding, at said image forming apparatus, whether to execute or cancel the processing in accordance with said information on the second operation, depending on a type of said information on the second operation.

\* \* \* \* \*